United States Patent
George et al.

(10) Patent No.: US 12,259,791 B2
(45) Date of Patent: Mar. 25, 2025

(54) OBJECT STORE DATA MANAGEMENT CONTAINER WITH INTEGRATED SNAPSHOT DIFFERENCE INTERFACE FOR COMPLIANCE SCANS

(71) Applicant: NetApp Inc., San Jose, CA (US)

(72) Inventors: Tijin George, San Jose, CA (US); Sharankumar Yelheri, Santa Clara, CA (US)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 18/193,838

(22) Filed: Mar. 31, 2023

(65) Prior Publication Data
US 2023/0359585 A1  Nov. 9, 2023

Related U.S. Application Data

(60) Provisional application No. 63/338,066, filed on May 4, 2022.

(51) Int. Cl.
*G06F 7/02*  (2006.01)
*G06F 11/14*  (2006.01)
(Continued)

(52) U.S. Cl.
CPC ...... *G06F 11/1451* (2013.01); *G06F 11/1469* (2013.01); *G06F 11/1471* (2013.01);
(Continued)

(58) Field of Classification Search
CPC .............. G06F 11/1451; G06F 16/125; G06F 11/1469; G06F 11/1471; G06F 16/11; G06F 16/128; G06F 2201/84
See application file for complete search history.

(56) References Cited

U.S. PATENT DOCUMENTS 9,612,910 B2  4/2017  Kulkarni et al.
10,620,866 B1  4/2020  Kumar et al.
(Continued)

FOREIGN PATENT DOCUMENTS

CN  105677516 A  * 6/2016  .......... G06F 11/1448
CN  105677516 B  * 11/2019  .......... G06F 11/1448

OTHER PUBLICATIONS

Notice of Allowance mailed on Apr. 11, 2024 for U.S. Appl. No. 18/193,825, filed Mar. 31, 2023, 08 pages.
(Continued)

*Primary Examiner* — Bruce M Moser
(74) *Attorney, Agent, or Firm* — Cooper Legal Group, LLC

(57) ABSTRACT

Techniques are provided for a snapshot difference interface integrated into an object store data management container. The snapshot difference interface is capable of interpreting an object format and snapshot file system format of snapshots backed up to an object store within objects formatted according to the object format. The snapshot difference interface can identify differences between snapshots, such as files that changed between the snapshots, while the snapshots are still resident within the object store. Because the snapshot difference interface does not retrieve the snapshots from the object store, security is improved, resource and network consumption is reduced, and there is less of an impact upon client I/O processing. Also, a compliance scan for the snapshots can be performed much quicker by skipping already scanned snapshot data from a prior compliance scan.

23 Claims, 11 Drawing Sheets

(51) Int. Cl.
*G06F 16/00* (2019.01)
*G06F 16/11* (2019.01)

(52) U.S. Cl.
CPC ............ *G06F 16/125* (2019.01); *G06F 16/11* (2019.01); *G06F 16/128* (2019.01); *G06F 2201/84* (2013.01)

(56) References Cited

U.S. PATENT DOCUMENTS

| | | | |
|---|---|---|---|
| 10,852,976 | B2 | 12/2020 | George et al. |
| 10,992,768 | B1* | 4/2021 | Bhatnagar ............. H04L 67/568 |
| 11,016,943 | B2 | 5/2021 | George et al. |
| 11,144,498 | B2 | 10/2021 | George et al. |
| 11,188,500 | B2 | 11/2021 | Kushwah et al. |
| 12,061,525 | B2 | 8/2024 | George et al. |
| 2007/0124341 | A1 | 5/2007 | Lango et al. |
| 2014/0108351 | A1 | 4/2014 | Nallathambi et al. |
| 2019/0235971 | A1 | 8/2019 | Botelho et al. |
| 2020/0285611 | A1 | 9/2020 | George et al. |
| 2020/0285613 | A1 | 9/2020 | George et al. |
| 2020/0285614 | A1 | 9/2020 | George et al. |
| 2022/0342851 | A1* | 10/2022 | Singh .................... G06F 16/128 |
| 2023/0171195 | A1 | 6/2023 | Kalman et al. |
| 2023/0359529 | A1 | 11/2023 | George et al. |
| 2024/0403168 | A1 | 12/2024 | George et al. |

OTHER PUBLICATIONS

Notice of Allowance mailed on Jul. 15, 2024 for U.S. Appl. No. 18/193,825, filed Mar. 31, 2023, 05 pages.

* cited by examiner

OBJECT STORE DATA MANAGEMENT CONTAINER WITH INTEGRATED SNAPSHOT DIFFERENCE INTERFACE FOR COMPLIANCE SCANS

RELATED APPLICATIONS

This application claims priority to U.S. Provisional Patent Application, titled "object store data management container with integrated snapshot difference interface for cataloging snapshots while resident in object store", filed on May 4, 2022 and accorded Application No.: 63/338,066, which is incorporated herein by reference.

BACKGROUND

A device such as a node may store data within a volume on behalf of a client. The volume may be stored within storage managed by the node, such as within on-prem storage. The node may implement storage management functions for the client. For example, the node may create backups of the volume by creating snapshots of the volume. A snapshot of the volume may capture a point-in-time representation of a state of the volume. The device may use the snapshot in order to restore the volume back to the state of the volume captured by the snapshot. Over time, a large number of snapshots may be created, which can consume a significant amount of storage. In order to more efficiently and cost effectively store these snapshots, the snapshots may be backed up to an object store that provides low cost and long term scalable storage compared to the storage managed by the node. The backup of the snapshots may be retained within the object store according to various compliance policies, data retention polices, write-once read-many (WORM) policies, and/or data privacy regulations.

DETAILED DESCRIPTION

Figure 1:
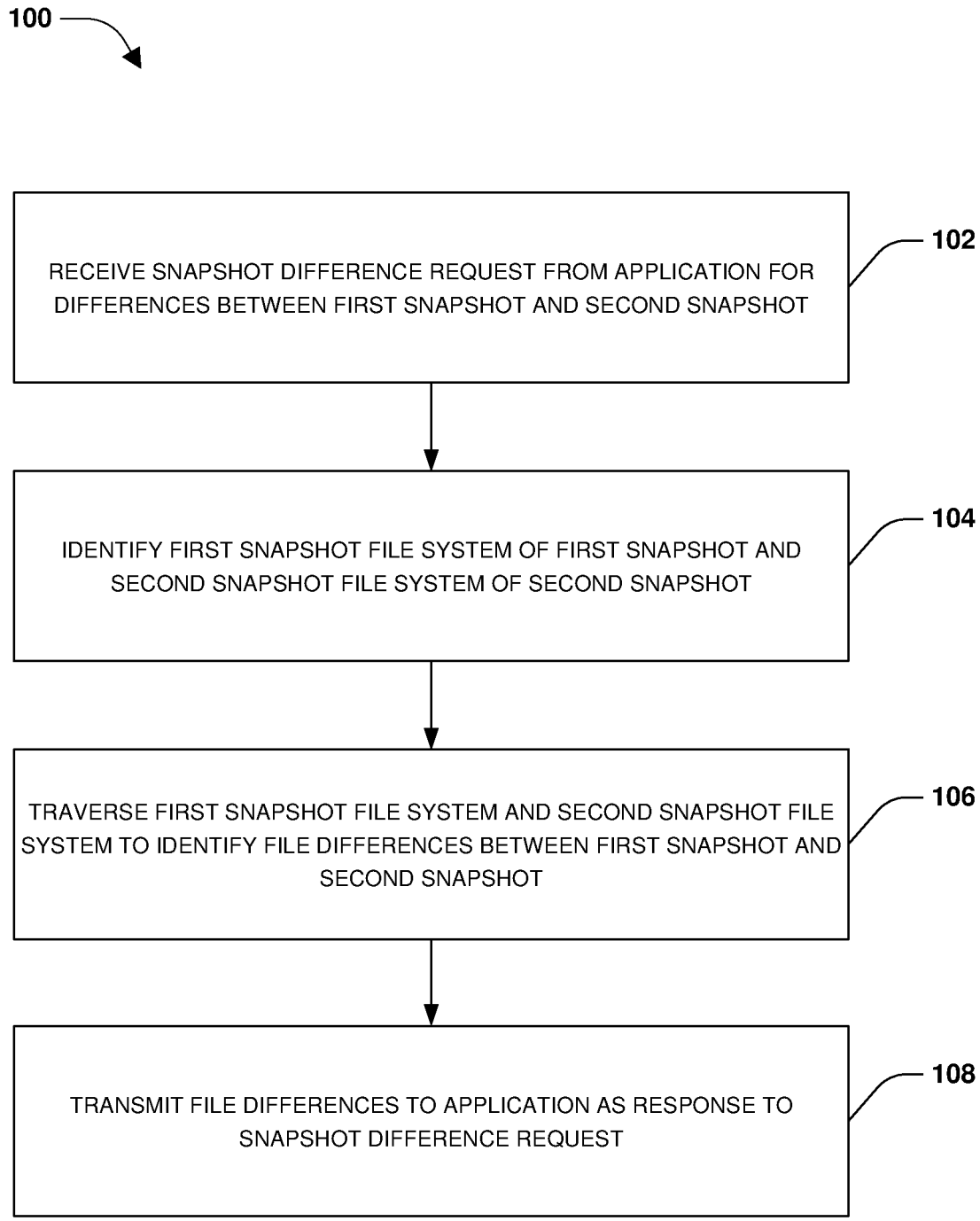
FIG. 1 is a flow chart illustrating an example method for implementing a snapshot difference interface hosted within an object store data management container in accordance with various embodiments of the present technology.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

A storage system provides a client with storage functionality, such as the ability to store data within a volume that is stored on-premise or elsewhere. The storage system provides backup functionality for the volume, such as the ability to create snapshots of the volume as point-in-time representations of the volume, which can be used to restore the volume to a state captured by a snapshot. The storage system is configured to store the snapshots into an object store, such as a cloud computing environment. For example, the storage system stores snapshot data of the snapshots into objects, and may store the objects into the object store at an endpoint such as a storage bucket. The objects are formatted according to an object format that represents snapshots according to a snapshot file system, such as a tree structure used to locate snapshot data stored within the objects. An object comprises snapshot data of one or more snapshots, and snapshot data of a snapshot may be stored across multiple objects.

The data within the volume may be subject to various compliance policies. In some embodiments, a compliance policy relates to a data retention policy. The data retention policy is associated with a particular volume or other granularity of data. The data retention policy may specify that a certain number of copies of the volume are to be retained any given point in time. The data retention policy may also specify that the copies are to be maintained for a certain time period. A compliance policy may relate to a write-once read-many (WORM) compliance policy. The WORM compliance policy may specify that certain data (e.g., the volume, snapshots of the volume, files, etc.) are to be retained in an immutable state (e.g., a state where the data cannot be modified and/or deleted) for a retention time period. The data is transitioned into the immutable state based upon various events, such as after a snapshot is created, when a particular date is reached, when a file is closed, when an external data source indicates that an event has occurred (e.g., a life insurance policy may be transitioned into the immutable state for a length of the life insurance policy when a data repository indicates that the life insurance policy has been signed; a bank account record may be transitioned into the immutable state for 5 years after a corresponding bank account has been closed; etc.), etc. A compliancy policy may relate to a data privacy regulation. The data privacy regulation may specify that only certain individuals or applications should have access to certain data. The data privacy regulation may specify that the data is to be encrypted with a particular level of encryption. The data privacy regulation may specify that certain security and access restrictions are to be in place for the data. A compliance policy may relate to a government compliance policy (e.g., bank records are to be maintained for 8 years; medical records are to be maintained for 15 years; etc.). In this way, the snapshots, backed up to the object store, may be subject to compliance policies that are enforced and verified as being correctly enforced by compliance scans to verify whether snapshot data of the snapshots are being stored within the object store in compliance with the compliance policies.

An object comprises snapshot data of one or more snapshots, and snapshot data of a snapshot may be stored across multiple objects. This makes the performance of snapshot operations such as performing a compliance scan non-trivial because snapshot data of a snapshot being scanned may be spread across multiple objects that may also comprise snapshot data of other snapshots. For example, an application is configured to perform compliance scans for snapshots of a volume to determine whether data and snapshots of the volume comply with a compliance policy such as where the data and snapshots are required to be stored for a required amount of time, are stored in a particular state (e.g., an immutable state), and/or a particular number of copies are being retained. Unfortunately, the application is unable to interpret the object format and snapshot file system of the snapshots, and thus cannot natively perform a compliance scan without external functionality capable of interpreting the object format and snapshot file system of the snapshots. Additionally, performing compliance scans over time is difficult, time consuming, and resource intensive because there could be hundreds of thousands of snapshots for hundreds of volumes that could have millions of files, which becomes inefficient and problematic when compliance scans are rescanning large amounts of data that was already scanned by a prior compliance scan.

With the aid of a storage operating system snapshot difference API, the application performs compliance scans or other snapshot operations upon snapshot data of snapshots backed up to the object store in objects according to the object format and snapshot file system. The application leverages the storage operating system snapshot difference API hosted at a primary datacenter (a local/primary system) in order to perform the compliance scan. The application makes calls to the storage operating system snapshot difference API in order to identify the difference between two snapshots (e.g., a previously scanned snapshot and a not yet scanned snapshot), which can be used by a current compliance scan so that only snapshot data not already scanned by a prior compliance scan (e.g., the difference between the two snapshots) is scanned by the current compliance scan, thus greatly reducing the time to complete the current compliance scan and resources consumed by the current compliance scan.

There are many problems with the application utilizing the storage operating system snapshot difference API hosted at the primary system. First, the storage operating system snapshot difference API hosted at the primary system is the only way for the application to perform compliance scans since the application cannot natively interpret the object format and the snapshot file system. For each snapshot being processed, the snapshot must be logged at the primary system until the entire operation is complete. There is no guarantee to the application for how long the primary system will retain the snapshot. If the compliance scan lags behind operations at the primary system (e.g., lags behind backups being performed for clients), then logged snapshots may be deleted by the primary system such as to free storage space.

Second, the application does not generally get direct access to a storage operating system due to security reasons. Many users impose restrictions upon transacting (e.g., the application transacting) with any file data or metadata with the storage operating system, as even a file name could be sensitive. Thus, the application is only allowed to create a relationship with the storage operating system and trigger an update such that only non-sensitive information is being transacted, which is very limiting.

Third, because there can be hundreds of thousands of snapshots of thousands of volumes that each could have millions of files, there is a large burden placed on the storage operating system of the primary system by the application. The storage operating system snapshot difference API is not lightweight, and there can be a large amount of CPU resources consumed when identifying differences of data between snapshots for the application. This adversely affects clients that are accessing the storage operating system of the primary system, such as for accessing primary data managed and hosted by the storage operating system.

As provided herein, a snapshot difference interface is integrated into an object store data management container in order to solve the aforementioned problems of the application otherwise relying upon the storage operating system snapshot difference API hosted at the primary system. The object store data management container is hosted in any type of computing environment, such as being hosted as a container of a container orchestration platform (Kubernetes), a serverless thread, a virtual machine, a server, a software module, a stateless container, a serverless and stateless container, etc. Instead of using the storage operating system snapshot difference API of the primary system to retrieve and log snapshots while the compliance scan is being performed, the application directly interfaces with the snapshot difference interface of the object store data management container, which can operate on the snapshots while the snapshots remain in the object store. Thus, the snapshots are not being retrieved and logged at the primary system. Instead, the snapshot difference interface of the object store data management container is directly operating on the snapshots in the object store while the snapshots are still resident (stored within) in the object store. Any number of instances of the snapshot difference interface can be created and destroyed on-demand based upon a current workload and/or time allocated for identifying differences between snapshots. The more work to be performed (e.g., a large number of snapshots to evaluate and compare as part of the compliance scan) and/or the shorter the time allocated, the more instances of the snapshot difference interface that are created on-demand for reducing the time to complete the task of identifying the differences amongst the snapshots as part of the compliance scan. The instances of the snapshot difference interface can be destroyed on-demand to converse resource consumption.

The snapshot difference interface is capable of identifying changes (file changes and metadata changes) amongst snapshots while the snapshots are resident in the object store so that the application can utilize this information to perform various operations such as the compliance scan to determine if snapshot data (files) are stored within objects of the object store in compliance with a particular compliance policy. This can be achieved because the snapshot difference interface is configured to interpret and traverse the object format and snapshot file system used to store snapshots in the object store. Because these snapshots are operated on while stored in the object store, the snapshot difference interface implements various new mechanisms to adjust for this fact, such as by performing checkpointing, providing information back to the application in batches, performing subsequent requests where a prior request left off, etc.

The snapshot difference interface of the object store data management container provides various improvements upon the prior storage operating system snapshot difference API hosted at the primary system. First, the application will no longer experience errors or prolonged task execution delay that would otherwise occur when the primary system would locally log snapshots that would deleted (e.g., such as to free storage space for processing client I/O) before the application completes a current task such as a compliance scan. With this innovation, the snapshot difference interface can identify the difference between the snapshots while the snapshots still reside in the object store as opposed to being retrieved and logged at the primary system. This allows the application to perform the compliance scan at its own pace without running into issues where the primary system deletes such snapshots before the compliance scan is complete.

Second, the snapshot difference interface solves security issues between the application and the primary system because the application is now interacting with the snapshot difference interface of the object store data management container that does not have cumbersome security issue when managing and accessing snapshots in the object store since the object store data management container already has access to this snapshot data (e.g., the object store data management container may be hosted as a serverless and/or stateless container within a cloud computing environment that also hosts the object store).

Third, the snapshot difference interface of the object store data management container alleviates the resource burden otherwise placed on the primary system by the application calling the prior storage operating system snapshot difference API hosted at the primary system. The prior storage operating system snapshot difference API hosted at the primary system was not a lightweight mechanism and can starve resources that could otherwise be used by the primary system to process client I/O and storage management request. With the new snapshot difference interface of the object store data management container, the object store data management container can be dynamically created and deleted on-demand as a container to host the snapshot difference interface separate from the primary system. If a current snapshot difference workload increases, then any number of parallel processes/containers can be spun up to perform the snapshot difference work faster since compute and storage are disassociated, thus allowing snapshot difference orchestration to scale up or down as needed.

Some embodiments of the snapshot difference interface performing a difference operation (diffing) to identify file changes between two snapshots residing in the object store is as follows: the snapshot difference interface diffs (e.g., performs a difference operation between) an inofile root to get changed file block numbers (fbns) between two snapshots. The changed fbns represent blocks with changed inodes. The snapshot difference interface reads a changed fbn block and diffs the inodes of the changed fbn block (e.g., each changed fbn may have maximum of 14 inodes or any other number of inodes). In particular, the snapshot difference interface read all the inodes (e.g., 14 inodes) from the changed fbn block (as a diff block) from both of the snapshots. The snapshot difference interface diffs each inode block to get inodes that are different. For each inode with links (e.g., hard links to external inodes), an inode to path structure is traversed to obtain the changed link inodes. The snapshot difference interface fills attributes (e.g., within snapshot difference information) from the changed inodes in order to respond back to the application with the snapshot difference information. For example, the snapshot difference interface constructs a file name by performing the following: for each inode that is different, a reverse lookup is performed. A parent inode and entry offset within the parent inode is obtained and used to traverse up a snapshot file system to reach a root inode of the file to determine the file name.

In some embodiments of the snapshot difference interface identifying changed blocks, modification of a block (a data block) of a file will result in replacing the block instead of overwriting the original block. A buftree of the file is remapped to point to the new block by replacing indirect blocks at every level until reaching a root of the buftree. A difference operation of the snapshot difference interface takes advantage of this mechanism to identify the changes between the copies of the file in two snapshots. The difference operation compares the buftrees of the file in two snapshots (e.g., buftrees within snapshot file systems) and will traverse down a particular sub-tree only if a root of the sub-tree has changed, which will happen only if at least one of the blocks (file blocks) underneath the sub-tree has changed. Therefore, with this mechanism, the difference operation will efficiently walk the buftrees to identify changes in only those paths where data has changed. If there are no changes under a subtree, the difference operation will hop over by the stride of the subtree within the buftrees.

In some embodiments, the object store data management container reports the changed files in two snapshots. To achieve this, the snapshot difference interface performs a difference operation for an inofile root (e.g., a file containing inodes of all files captured by a snapshot). Changed fbns of these files gives the changed inodes in the snapshot. In some embodiments, the snapshot difference interface performs an inofile root difference operation to obtain changed fbns of a particular file. In some embodiments, the snapshot difference interface identifies inodes from changed fbns. Each user block (e.g., an L0 block) of an inofile root has 14 inodes or some other number of inodes. The snapshot difference interface compares individual inodes within changed fbns to get changed inodes. The snapshot difference interface reads the changed fbn blocks of a base snapshot and an incremental snapshot (a pair of snapshots being diffed). For each block after denormalization, a comparison is performed for each inode contents. In some embodiments, the snapshot difference interface constructs file names from inodes. Using the diff inode (a changed inode), the snapshot difference interface constructs file paths by performing a reverse lookup using the following: Get primary_t structure from inode: typedefstructs2c_primary_name_s {uint32_tspn_parent_dir_inode; uint32_tspn_cookie;} s2c_primary_name_t. A spn_cookie points to an fbn and a slot (e.g., a slot within an object) where the name of the file exists. The higher 20 bits (or some other number of bits) is the fbn of a directory inode, and lower 12 bits (or some other number of bits) is an entry number within that particular fbn. This is repeated until the snapshot difference interface reaches the root inode (e.g., root inode 64). For hard links, an inode to path metafile is queried to obtain another path for the same inode.

Figure 2:
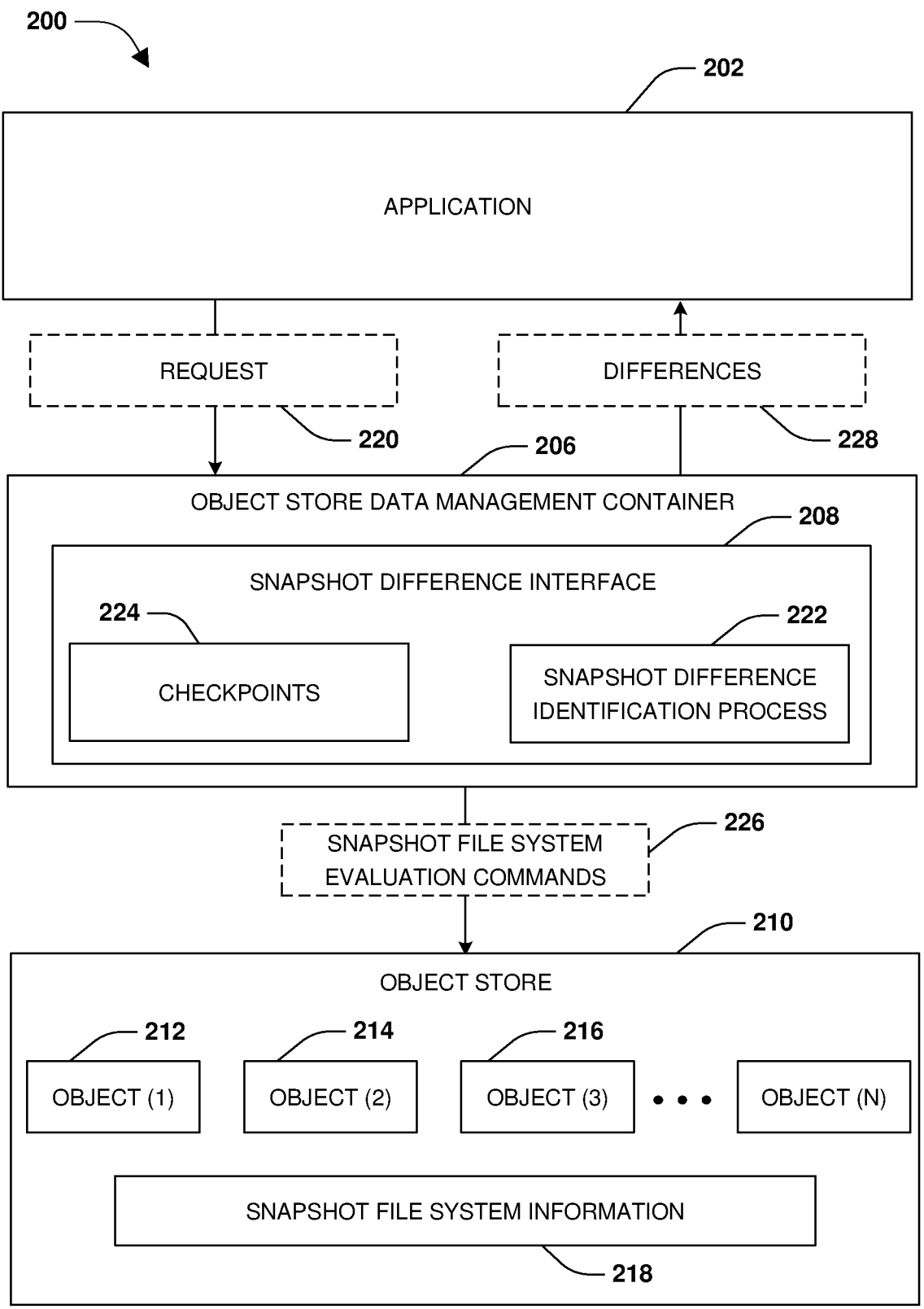
FIG. 2 is a block diagram illustrating an example system for implementing a snapshot difference interface hosted within an object store data management container in accordance with various embodiments of the present technology.
Figure 3:
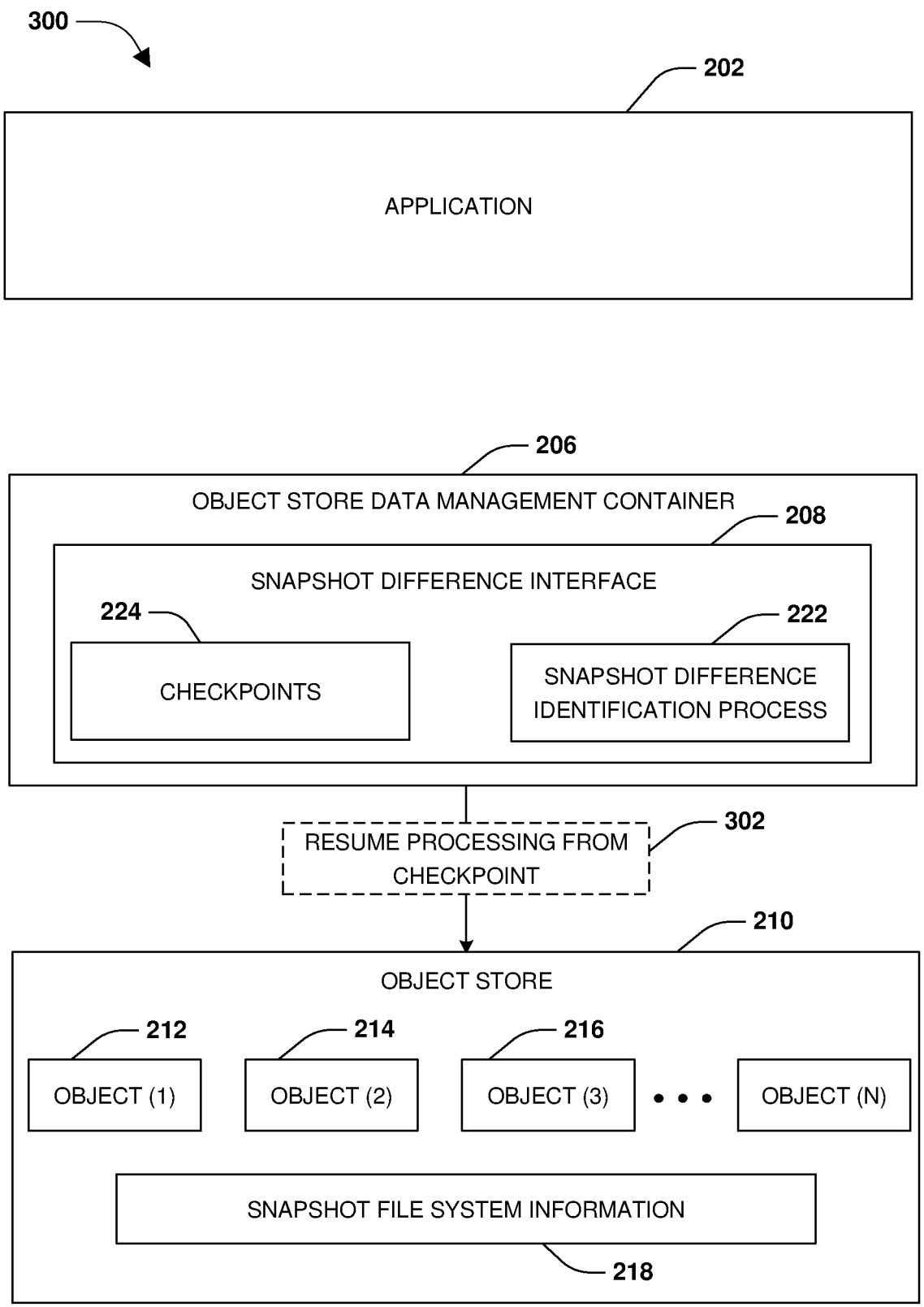
FIG. 3 is a block diagram illustrating an example system for implementing a snapshot difference interface hosted within an object store data management container in accordance with various embodiments of the present technology.

One embodiment of implementing a snapshot difference interface integrated into an object store data management container is illustrated by an exemplary method 100 of FIG. 1, which is further described in conjunction with the system 200 of FIG. 2 and system 300 of FIG. 3. A storage system hosts a volume within which data may be stored on behalf of a client. The storage system may generate snapshots of the volume. Snapshot data of the snapshots are stored into objects, and the snapshots are represented by snapshot file systems. The objects, such as a first object 212, a second object 214, and a third object 216, are stored within an object store 210 such as an object store of a cloud computing environment. The objects are formatted according to an object format. The snapshot file systems may be stored as snapshot file system information 218 (metadata) within the object store 210. It may be appreciated that an example of the object format is illustrated by FIG. 7C and that an example of a snapshot file system (a tree structure stored within the snapshot file system information 218) is illustrated by FIG. 7B.

An object store data management container 206 has access to the object store 210. The object store data management container 206 may be hosted within the cloud computing environment hosting the object store 210, on-premise remote to the object store 210, or within any other computing environment. The object store data management container 206 may be hosted as a container within a container orchestration environment (Kubernetes), a serverless thread, a virtual machine, a server, a software module, a serverless and/or stateless container, etc. The object store data management container 206 may host a snapshot difference interface 208.

The snapshot difference interface 208 is natively capable of interpreting the object format and snapshot file system (snapshot file system information 218). For example, the snapshot difference interface 208 can traverse and process the snapshot file system information 218 (e.g., traverse and read a base root object, snapinfo objects, inofiles, etc.) in order to identify files, inodes, directories, metadata, and/or other data of multiple snapshots in order to identify changed files, inodes, directories, metadata, and/or other data between the snapshots, along with identifying which objects (slots within objects) comprise snapshot data of the particular snapshots. The snapshot difference interface 208 is capable of directly interfacing with the snapshots stored within the object store 210 while the snapshots are actually stored within the object store 210 (stored within the objects) and without having to retrieve the snapshots from the object store 210. The snapshot difference interface 208 is accessible to an application 202 such that the snapshot difference interface 208 can process a request 220 (a snapshot difference request) from the application 202 for identifying snapshot differences (changed files) between two snapshots. The snapshot differences of changed files, metadata, directories, or other data between a pair of snapshots may be used for various purposes, such as for performing compliance scans, incremental backup and restore operations, building a catalog to track what files, directories, metadata, and/or versions thereof are backed up through certain snapshots in the object store 210, etc.

During operation 102 of method 100, the snapshot difference interface 208 of the object store data management container 206 receives the request 220 from the application 202 for differences amongst a set of snapshots such as a first snapshot and a second snapshot, or any other number of snapshots (e.g., all snapshots of a particular volume, snapshots created during a particular timespan, etc.). The snapshot difference interface 208 is configured to identify the snapshot differences while the first snapshot and the second snapshot are retained within the object store 210 and without retrieving the first snapshot and second snapshot from the object store 210. The snapshot difference interface 208 implements a snapshot difference identification process 222 to identify the snapshot differences. In some embodiments, the request 220 may include a first snapshot identifier of the first snapshot and a second snapshot identifier of the second snapshot.

The snapshot difference identification process 222 performs snapshot file system evaluation commands 226 that are implemented through the object store 210 to evaluate the first snapshot and the second snapshot for identifying the snapshot differences without retrieving the first snapshot and the second snapshot from the object store 210. During operation 104 of method 100, a first snapshot file system of the first snapshot and a second snapshot file system of the second snapshot are identified based upon the first snapshot identifier and the second snapshot identifier in the request 220. The first snapshot file system and the second snapshot file system may be stored within the snapshot file system information 218 as metadata, and may be identifiable using the snapshot identifiers.

The snapshot file system evaluation commands 226 are performed by the snapshot difference interface 208 to traverse the first snapshot file system of the first snapshot and the second snapshot file system of the second snapshot to determine the differences between the first snapshot and the second snapshot (e.g., differences amongst files, directories, metadata, and/or other data captured by the two snapshots), during operation 106 of method 100. During performance of the snapshot file system evaluation commands 226 by the snapshot difference identification process 222 executed by the snapshot difference interface 208, the snapshot difference interface 208 may generate checkpoints 224 that can be used to resume 302 the snapshot difference identification process 222 from a progress point captured by a checkpoint, as illustrated by FIG. 3. This allows the snapshot difference identification process 222 to be paused, resumed, and/or transitioned from one instance of the snapshot difference interface 208 to a different instance of the snapshot difference interface 208 such as for load and/or performance balancing.

In some embodiments of evaluating the first snapshot file system of the first snapshot and the second snapshot file system of the second snapshot, the snapshot difference interface 208 executes the snapshot difference identification process 222 to perform a difference operation as part of the snapshot file system evaluation commands 226. The difference operation is performed upon an inofile root (e.g., a root of inofile 718 of FIG. 7B) to obtain file block numbers representing blocks of changed inodes (a change inode corresponding to a changed file) between the first snapshot and the second snapshot. The snapshot difference identification process 222 reads the blocks represented by the file block numbers and performs difference operations (as the snapshot file system evaluation commands 226) on the blocks to identify inodes that are different between the first snapshot and the second snapshot (inodes of changed files that are different between the first snapshot and the second snapshot).

In some embodiments, the snapshot difference identification process 222 reads a set of inodes from the first snapshot and the second snapshot to identify inodes that are different. These inodes correspond to different versions of a file between the first snapshot and the second snapshot (e.g., the file may be modified from when the first snapshot was created to when the second snapshot was created). For an inode with a link (a hard link), an inode to path (I2P) metafile is traversed to identify and obtain changed link inodes (link inodes that are linked to by hard links where the link inodes are different between the first snapshot and the second snapshot). The changed inodes (inodes that are different) and the changed link inodes may correspond to the snapshot differences (e.g., an inode of the first snapshot that is different than the inode of the second snapshot, which may correspond to different versions of a file within the first snapshot and the second snapshot).

As part of identifying the snapshot differences, file names (file paths) may be reconstructed for the files that are different between the first snapshot and the second snapshot (files corresponding to the changed/different inodes). For an inode identified as being different between the first snapshot and the second snapshot, a reverse lookup may be performed to obtain a parent inode and an entry offset within the parent inode of the inode. This information is used to traverse up a snapshot file system (a tree structure such as a buftree of a file represented by the inode) to a root inode specifying the file name. In this way, file names (file paths) may be identified as part of the snapshot differences.

In some embodiments, as subsequent requests for snapshot differences between other snapshots are received from the application 202, the snapshot difference interface 208 may continue to process the requests, which may pick up from where a last snapshot difference for a pair of snapshots left off. For example, if snapshot differences for a plurality of snapshots are being identified, then already processed pairs of snapshots are not re-evaluated for subsequent requests.

During operation 108 of method 100, the differences 228 between the first snapshot and the second snapshot are transmitted by the object store data management container 206 to the application 202 as a response to the request 220. In some embodiments, the request 220 is processed by any number of instances of the snapshot difference interface 208 hosted by object store data management containers. In some embodiments, different block ranges storing data of the two snapshots are identified and processed by different instances of the snapshot difference interface 208 (e.g., a first block range of the first and second snapshots may be processed by a first instance of the snapshot difference interface 208, while a second block range of the first and second snapshots may be processed by a second instance of the snapshot difference interface 208, etc.). If the request 220 is for differences amongst a plurality of snapshots (e.g., snapshots of a volume or of a set of volumes), then different snapshots or snapshots of different volumes are assigned to and processed by difference instances of the snapshot difference interface 208.

Figure 4:
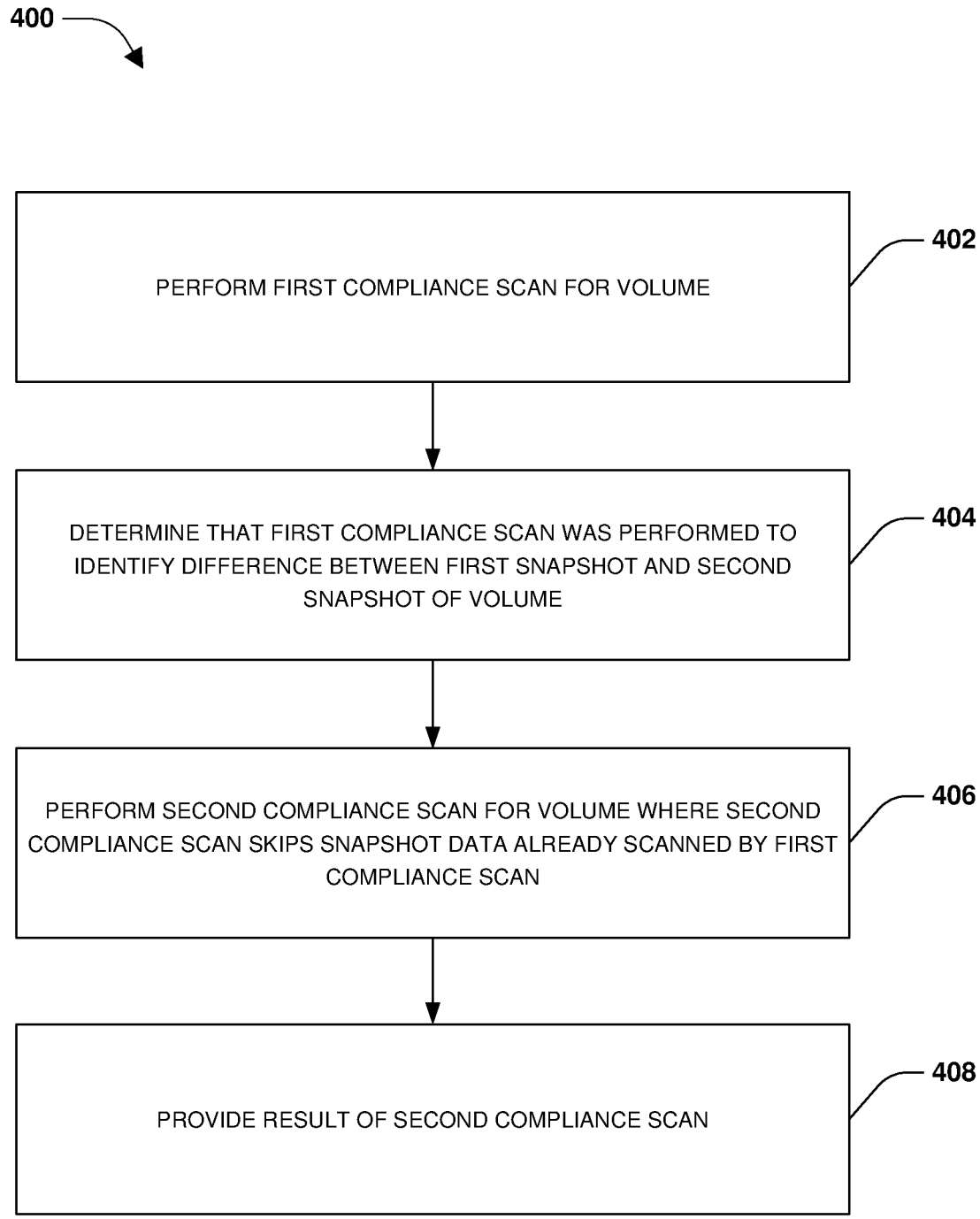
FIG. 4 is a flow chart illustrating an example method for implementing a snapshot difference interface for performing compliance scans in accordance with various embodiments of the present technology.
Figure 5A:
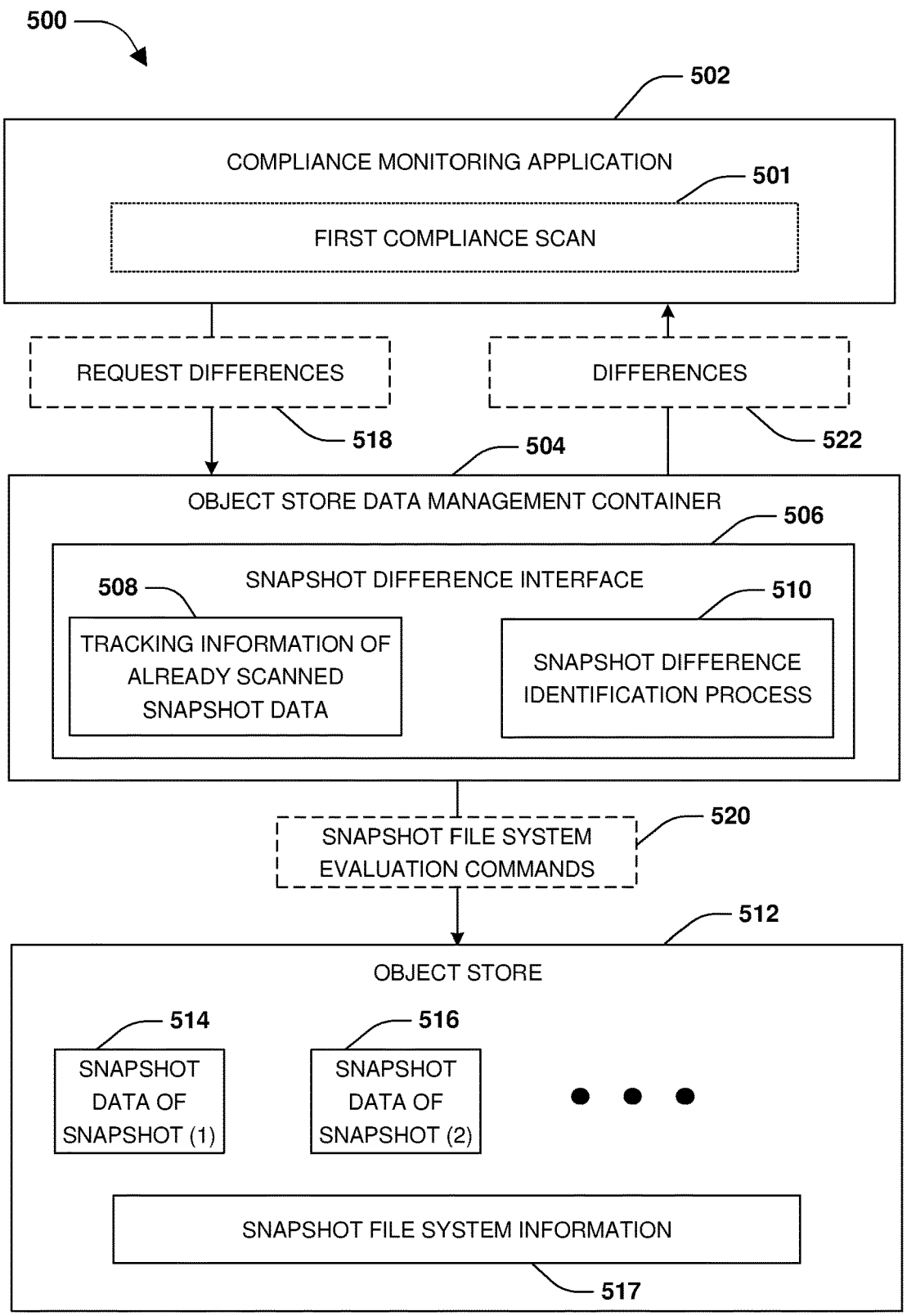
FIG. 5A is a block diagram illustrating an example system for implementing a snapshot difference interface for performing compliance scans, where a first compliance scan is performed in accordance with various embodiments of the present technology.
Figure 5B:
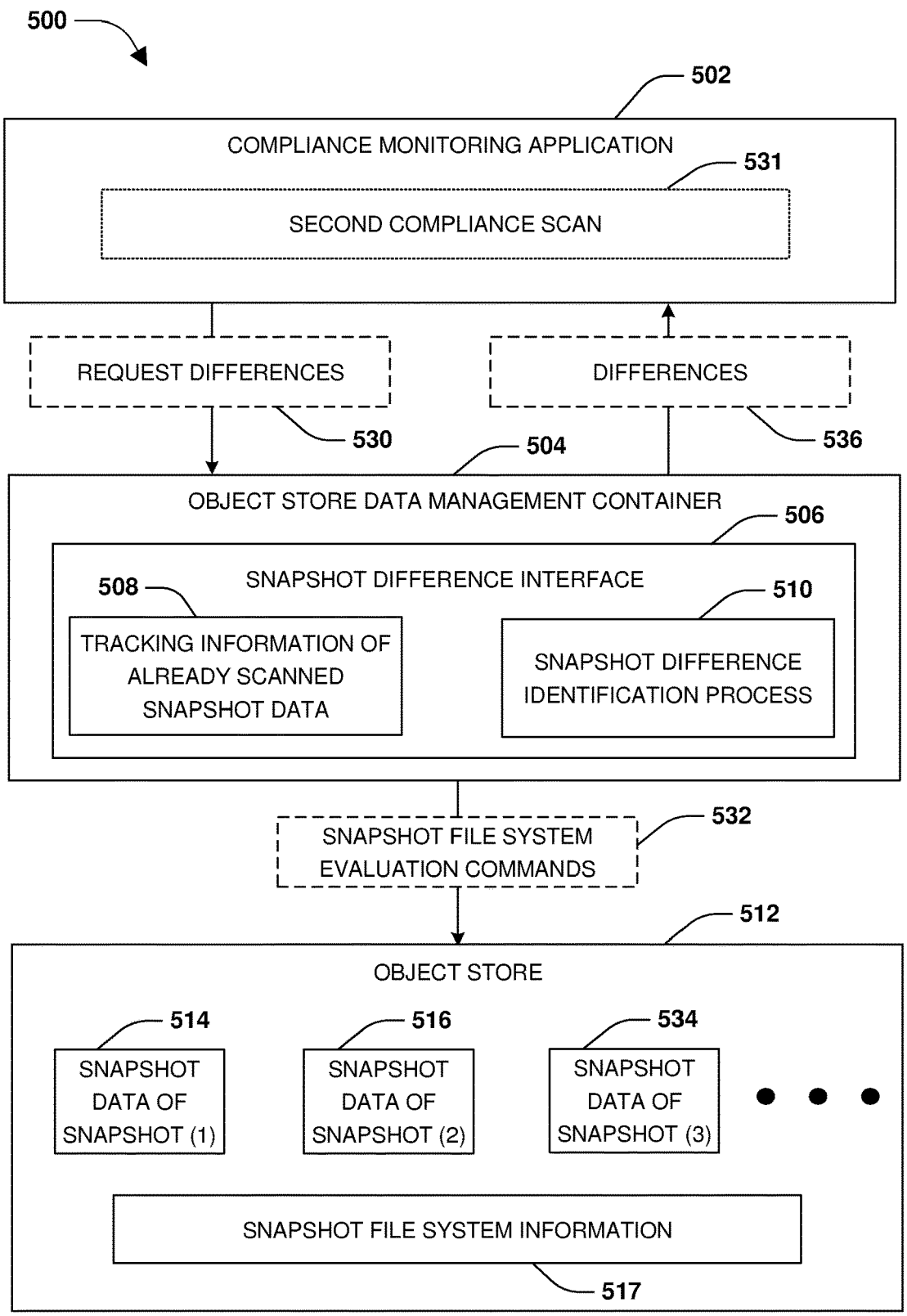
FIG. 5B is a block diagram illustrating an example system for implementing a snapshot difference interface for performing compliance scans, where a second compliance scan is performed in accordance with various embodiments of the present technology.

FIG. 4 is a flow chart illustrating an example method for implementing a snapshot difference interface for performing compliance scans, which is described in conjunction of system 500 of FIGS. 5A and 5B. Snapshot data of snapshots are stored within an object store 512, such as where the snapshot data is stored within objects having an object format. In some embodiments, snapshot data of a first snapshot 514, snapshot data of a second snapshot 516, and/or snapshot data of other snapshots are stored within the object store 512, as illustrated by FIG. 5A. The snapshots are represented by snapshot file systems stored within snapshot file system information 517. A snapshot difference interface 506 is hosted on-demand through an object store data management container 504 (e.g., a serverless and/or stateless container), such as in response to a compliance monitoring application 502 requesting 518 differences between the first snapshot 514 and the second snapshot 516 as part of implementing a first compliance scan 501. For example, a prior compliance scan previously scanned the first snapshot 514. Accordingly, the first compliance scan 501 can be performed more efficiently (e.g., quicker and using less resources) by not scanning the snapshot data of the first snapshot 514 that was already scanned by the prior compliance scan, and just scan the "newer" data not yet scanned. The "newer" data not yet scanned corresponds to the difference between the first snapshot 514 and the second snapshot 516.

In some embodiments, the compliance monitoring application 502 is implement the first compliance scan 501, as illustrated by FIG. 5A. In some embodiments, the snapshot difference interface 506 implements the first compliance scan 501. In some embodiments, the object store data management container 504 implements the first compliance scan 501.

In some embodiments, the first compliance scan 501 may be part of enforcing a data retention policy associated with retaining snapshots of a volume as backups within the object store (e.g., a cloud computing environment) for a particular retention period (e.g., 5 years). The data retention policy may also specify that a particular number of copies (e.g., 4 copies stored within different storage locations, such as different storage devices, cloud storage buckets, nodes, storage sites, etc.) of the volume (e.g., versions of files, directories, metadata, etc. created over time in the volume) are to be maintained at any given point of time. In some embodiments, the first compliance scan 501 may be part of enforcing a write-once read-many (WORM) compliance for snapshots of the volume backed up to the object store. Worm compliance may specify that snapshot data of snapshots of the volume are to be retained in an immutable state (e.g., a state where the snapshot data cannot be modified and/or deleted) for a retention period such as 5 years after being transitioned into the immutable state. In some embodiments, the first compliance scan 501 may be part of enforcing a data privacy regulation, such as to ensure that the snapshot data is stored with certain security measures (e.g., only certain users or applications have access to certain snapshot data), with a certain type of encryption, and/or with other access restrictions and rights that comply with the data privacy regulation. It may be appreciated that the first compliance scan 501 may be performed for a variety of other reasons.

During operation 402 of method 400, the first compliance scan 501 is implemented for the volume whose snapshot data is backed up to the object store 512 as the first snapshot 514 and the second snapshot 516. As part of implementing the first compliance scan 501, the snapshot difference interface 506 receives the request 518 specifying a first snapshot identifier of the first snapshot 514 (whose snapshot data was already scanned by the prior compliance scan) and a second snapshot identifier of the second snapshot 516 (whose snapshot data has not yet been scanned). Accordingly, the snapshot difference interface 506 executes a snapshot difference identification process 510 that implements snapshot file system evaluation commands 520 to identify differences between the first snapshot 514 and the second snapshot 516. The snapshot difference interface 506 provides differences 522 back to the compliance monitoring application 502 as a response to the request 518 so that the first compliance scan 501 can be performed merely on the differences 522 (the snapshot data not yet scanned) and can skip the common snapshot data (the snapshot data already scanned). In some embodiments, the snapshot difference interface 506 stores tracking information 508 of already scanned snapshot data, which may indicate that the prior compliance scan was performed on the first snapshot 514 and that the current first compliance scan 501 has now been performed upon the differences 522 between the first snapshot 514 and the second snapshot 516. In some embodiments, the tracking information 508 may instead be stored by the compliance monitoring application 502 so that the compliance monitoring application 502 can determine what differences amongst snapshots to request from the snapshot difference interface 506.

At a subsequent point of time after the first compliance scan 501 completed, the snapshot difference interface 506 receives a request 530 from the compliance monitoring application 502 as part of implementing a second compliance scan 531 subsequent the first compliance scan 501. In some embodiments, the request 530 specifies that snapshot data of snapshots of the volume are to be scanned for compliance purposes. This triggers the snapshot difference interface 506 to evaluate the tracking information 508 to determine whether any snapshot data of the volume has already been scanned. In this way, during operation 404 of method 400, the snapshot difference interface 506 determines that the first compliance scan 501 was performed and that differences 522 between snapshot data of the first snapshot 514 and snapshot data of the second snapshot 516 were already identified and scanned by the first compliance scan 501. The snapshot difference interface 506 makes this determination because the snapshot difference interface 506 can skip processing (diffing) the snapshot data that was already evaluated (diffed) as part of the first compliance scan 501 and thus the second compliance scan 513 can skip the already scanned data, which greatly reduces the time, cost, and resource consumption for implementing the second compliance scan 531. In some embodiments, the compliance monitoring application 502 maintains the tracking information 508, and thus the request 530 may merely request a difference between what was already scanned (the first snapshot 514 and the second snapshot 516) and what has not been scanned (a third snapshot 534) so that the second compliance scan 531 is merely executed upon the difference (the not yet scanned snapshot data).

During operation 406 of method 400, the second compliance scan 531 is implemented for snapshot data of the volume. The snapshot data is stored within the first snapshot 514, the second snapshot 516, and now a third snapshot 534. Because the snapshot difference interface 506 already determined the difference 522 between the first snapshot 514 and the second snapshot 516 and this difference 522 was scanned by the first compliance scan 501, the snapshot difference interface 506 skips that already scanned snapshot data. Instead, the snapshot difference interface 50 controls the snapshot difference identification process 510 to perform the snapshot file system evaluation commands 532 to identify differences 536 between the second snapshot 516 and the third snapshot 534. The differences 536 correspond to snapshot data that has not yet been scanned by prior compliance scans. In this way, the differences 536 are provided back to the compliance monitoring application 502, during operation 408 of method 400, as part of implementing the second compliance scan 531. In this way, the second compliance scan 531 merely scans the differences 536 and skips scanning the already scanned snapshots data. If a third compliance scan is performed, then already scanned snapshot data (e.g., snapshot data scanned by the first compliance scan 501 and snapshot data scanned by the second compliance scan 531) may be skipped by the snapshot difference interface 506 and the third compliance scan. Thus, merely a difference between the third snapshot 534 and a fourth snapshot may be scanned as part of the third compliance scan.

In some embodiments, as part of the snapshot difference interface 506 identifying differences between a pair of snapshots such as the first snapshot 514 and the second snapshot 516 as part of the first compliance scan 501, the snapshot difference identification process 510 executes a difference operation as part of the snapshot file system evaluation commands 532. The difference operation is executed upon an inofile root associated with at least one of the first snapshot file system or the second snapshot file system. The difference operation obtains file block numbers representing blocks of changed inodes between the first snapshot and the second snapshot stored within the object store 512. The differences 522 are identified based upon the blocks of changed inodes represented by the file block numbers.

In some embodiments, as part of the snapshot difference interface 506 identifying differences between a pair of snapshots such as the first snapshot 514 and the second snapshot 516 as part of the first compliance scan 501, the snapshot difference identification process 510 executes a difference operation as part of the snapshot file system evaluation commands 532. The difference operation is executed upon an inofile root associated with at least one of the first snapshot file system or the second snapshot file system. The difference operation obtains file block numbers that are different between the first snapshot 514 and the second snapshot 516 stored within the object store 512. Difference operations are performed upon the blocks represented by the file block numbers in order to identify inodes that are different between the first snapshot and the second snapshot. The differences 522 are identified based upon files represented by the inodes that are different between the first snapshot 514 and the second snapshot 516.

In some embodiments, as part of the snapshot difference interface 506 identifying differences between a pair of snapshots such as the first snapshot 514 and the second snapshot 516 as part of the first compliance scan 501, the snapshot difference identification process 510 reads a set of inodes from the first snapshot 514 and the second snapshot 516 to identify inodes that the different between the first snapshot 514 and the second snapshot 516 stored within the object store 512. The snapshot difference identification process 510 identifies an inode that includes a link. An inode to path associated with the link is traversed to identify changed link inodes that are different between the first snapshot 514 and the second snapshot 516. The changed link inodes are identified as part of the inodes that the different between the first snapshot and the second snapshot. The differences 522 are identified based upon files represented by the inodes that the different between the first snapshot 514 and the second snapshot 516.

In some embodiments, as part of the snapshot difference interface 506 identifying differences between a pair of snapshots such as the first snapshot 514 and the second snapshot 516 as part of the first compliance scan 501, the snapshot difference identification process 510 identifies an inode as different between the first snapshot 514 and the second snapshot 516. A reverse lookup is performed for the inode to identify a parent inode and an entry offset within the parent inode. A traversal is performed from the inode to the parent inode and up through at least one of the first snapshot file system or the second snapshot file system using the entry offset within the parent inode and entry offsets of other inodes encountered during the traversal to reach a root inode specifying a file name of a file represented by the inode. The file is identified as being different between the first snapshot 514 and the second snapshot 516. In this way, the differences 522 identify the file with the file name.

In some embodiments, as part of the snapshot difference interface 506 identifying differences between pairs of snapshots such as part of a compliance scan, the snapshot difference interface 506 generates checkpoints while identify a set of snapshot differences amongst the first snapshot 514 and the second snapshot 516. A checkpoint is used to resume processing of the first snapshot file system and the second snapshot file system from a progress point of the processing captured by the checkpoint.

In some embodiments, as part of the snapshot difference interface 506 identifying differences between pairs of snapshots such as part of a compliance scan, the snapshot difference interface 506 accumulates the file differences as batches of snapshot differences among the first snapshot 514 and the second snapshot 516. The snapshot difference interface 506 transmits the batches of snapshot differences to the compliance monitoring application 502 as a response.

In some embodiments, as part of the snapshot difference interface 506 identifying differences between pairs of snapshots such as part of a compliance scan, the snapshot difference interface 506 determines that a prior snapshot difference request for identifying the file differences between the first snapshot 514 and the second snapshot 516 left off at a progress point. The snapshot difference interface 506 utilizes the progress point to resume processing of the first snapshot file system and the second snapshot file system.

Figure 6:
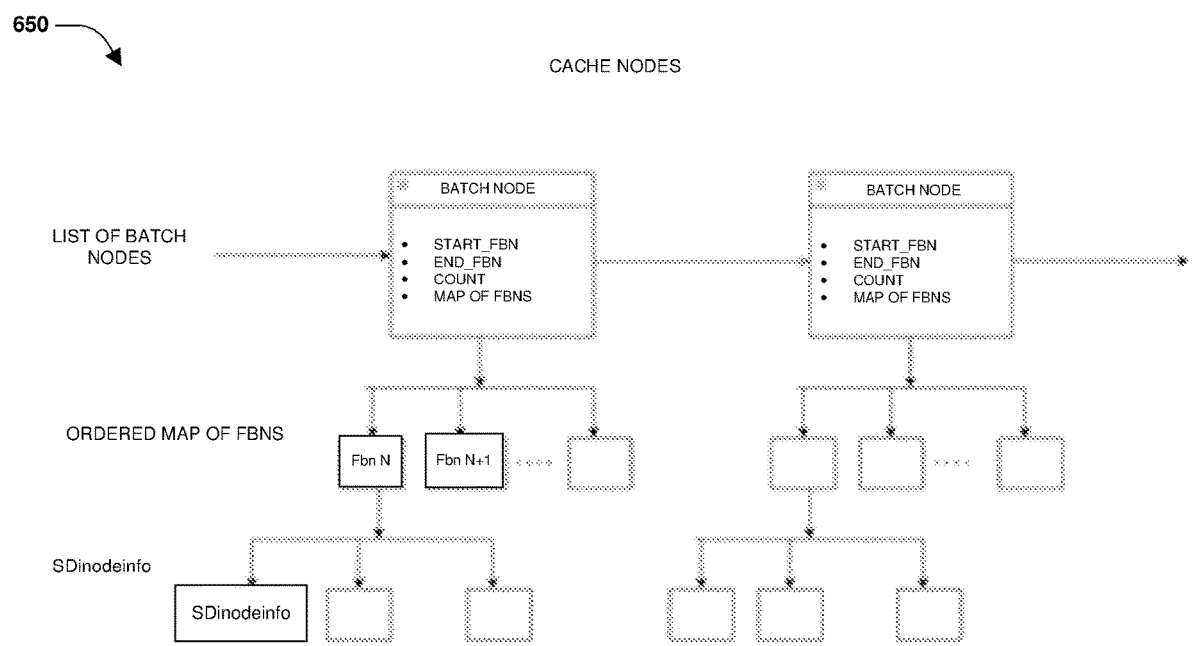
FIG. 6 is a block diagram illustrating an example system for caching nodes processed by a snapshot difference interface in accordance with various embodiments of the present technology.

FIG. 6 illustrates caching. A difference operation is performed on a batch of file block numbers (fbns) for each request (e.g., a request for a difference between two snapshots that include the fbns). The batches are stored as cache nodes 650 within memory. The cache nodes 650 include a list of batch nodes. A batch node includes a start fbn of the batch, an end fbn of the batch, a count of fbns of the batch, and a map of fbns (e.g., an ordered map of fbns) of the batch. The fbns in the map of fbns point to SDinodeinfos. A batch stores all changed records between a start fbn and an end fbn (e.g., a batch of fbns being processed/diffed by the difference operation for identifying any fbns that are different between a pair of snapshots). A whole batch is added or deleted together from the range of the start fbn to the end fbn. There are no duplicate batches maintained within the cache nodes 650 in the memory. Results are fetched/stored within the cache nodes 650 in the memory. In some embodiments, the memory has at most two nodes (batches) at any given point in time. In addition to using the cache nodes 650, a difference operation can make use of a least recently used (LRU) cache of an object store data management container to store blocks based on block types. There is also an inode to name cache, used as a reverse lookup to avoid walking a parent tree for known names of files identified as different between a pair of snapshots. The difference operation may use the object store data management container to perform a prefetch for slots while reading objects in the object store, which is used to prefetch additional continuous slots beyond a particular requested slot.

In some embodiments, the object store data management container 206 is a container that supports REST API requests (e.g., GET request) that may target the snapshot difference interface 208. An endpoint is a snapshot (a cloud backup) of a volume, which has a unique UUID (e.g., 8bc58108-081e-4a43-b919-a376c225bf53). So, the snapshot difference interface 208 may perform a difference operation (e.g., a diff operation such as a snapdiff operation) on the endpoint, and specifies the UUIDs of the 2 snapshots upon which the difference operation is to be performed (e.g., snapdiffs?base_snapshot=2fd61216-f909-4461-9b50-2be815da1f1a&diff_snapshot=83f447fc-c130-4dbf-828a-c176d725a170). Thus, this is used as a query. In some embodiments, there may be a maximum limit of the number of difference operations that may be performed at a given point of time (e.g., 8, 256, or any other number). If there are more difference operation results than the maximum limit, then the object store data management container 206 will return a 307 Response with a temporary redirect location that has a cookie that the object store data management container 206 can use to do the next set of difference operations and write the difference operation results once the object store data management container 206 is ready. In some embodiments, an example difference operation result (a snapshot difference) may be: Record Example "records": [{"atime": 1636503098, "change-type": "inode_modification", "crtime": 1636487623, "ctime": 1636503063, "dos-bits": 0, "fattr": 511, "filename": "/","ftype": 2, "group": 0, "inode": 64, "is-file-fenced": 0, "links": 3, "mtime": 1636503063, "owner": 0, "size": 4096}. The "filename": "I" is the root directory. The example difference operation result (a snapshot difference) may specify changes such as access time (atime), change time (ctime), or change type "inode modification." The object store data management container 206 may also return whether it is the "end-of-diff" and done, and may also return "num changes" between the two snapshots. The example difference operation result (a snapshot difference) may correspond to various change types, such as inode modification, file created, file deleted, etc. This information may be provided to the application 202 as the snapshot differences, which may identify changed files between the two snapshots. Other fields such as a progress field, flags, response time for API to write results, and/or other fields may be used.

Figure 7A:
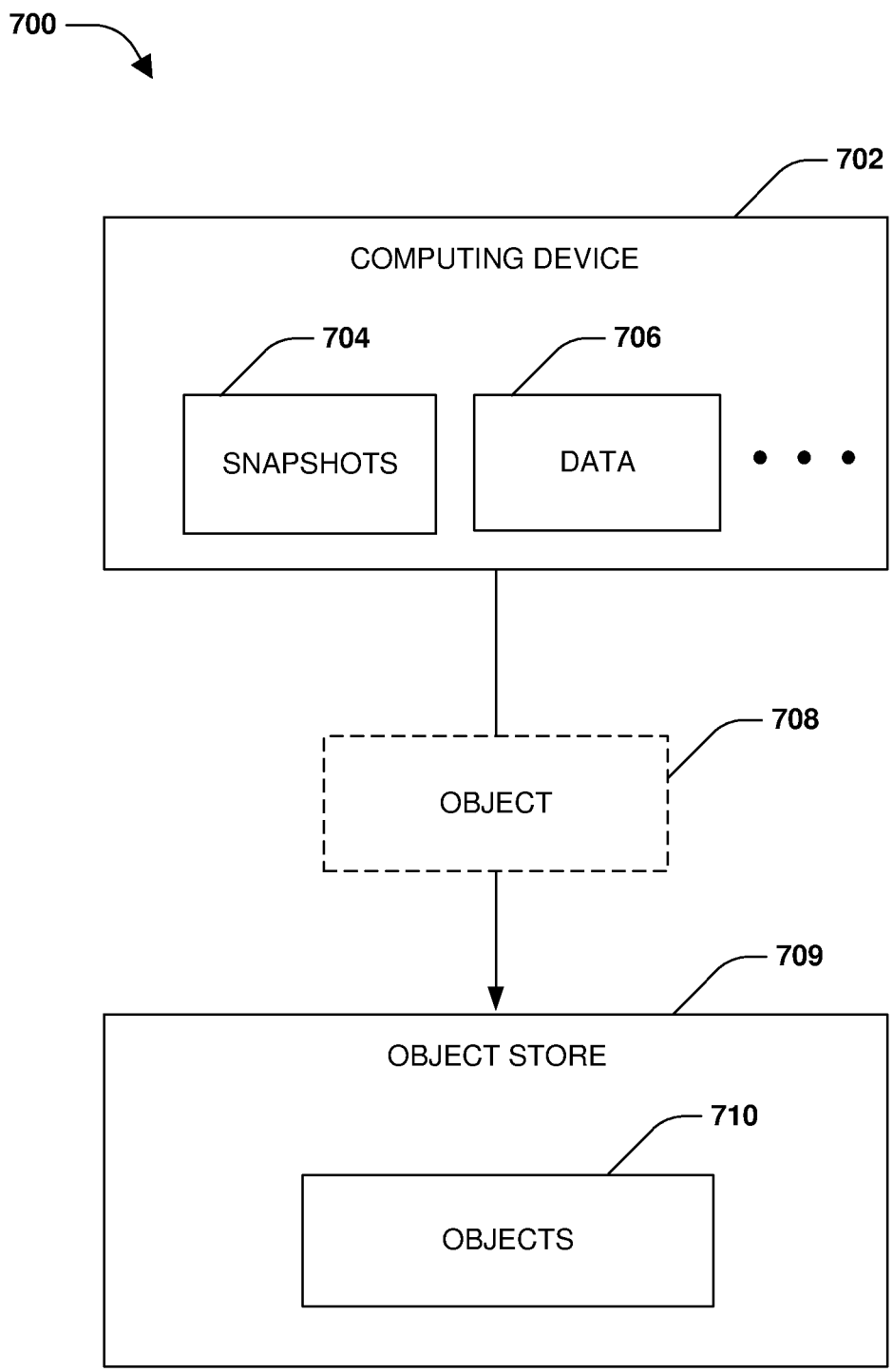
FIG. 7A is a component block diagram illustrating an example system for managing objects within an object store using an object file system.
Figure 7B:
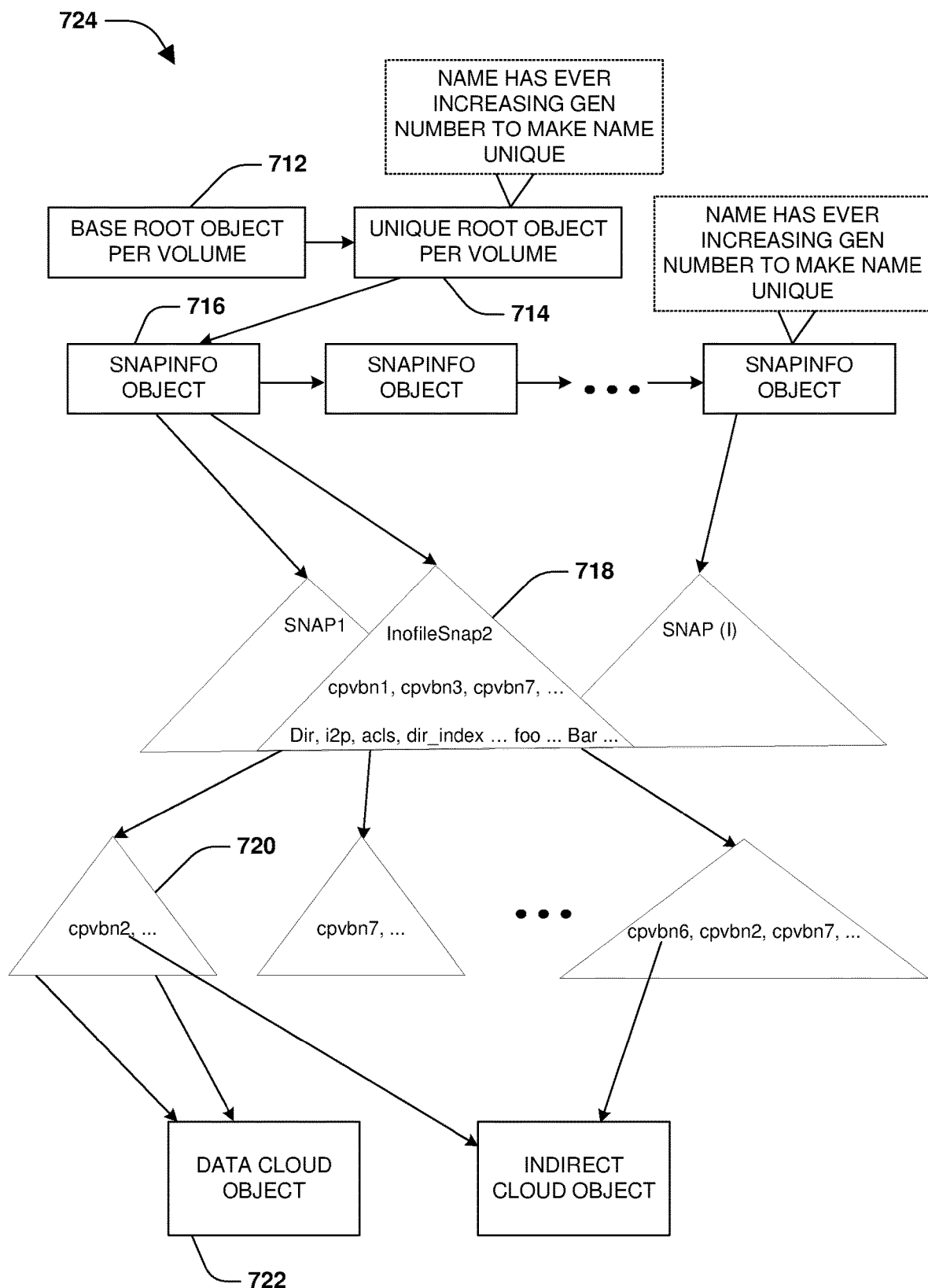
FIG. 7B is an example of a snapshot file system within an object store.
Figure 7C:
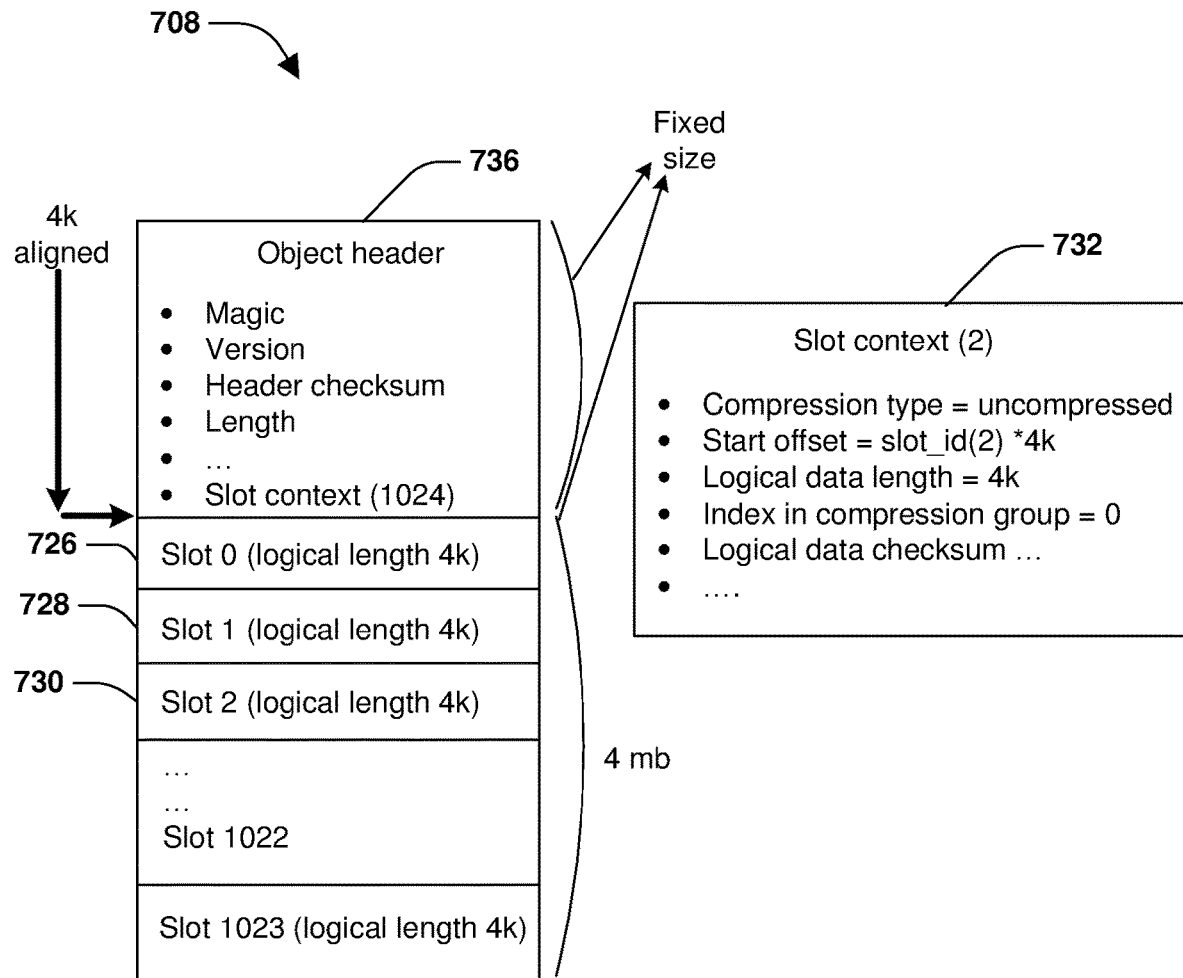
FIG. 7C is an example of an object stored within an object store.

FIG. 7A illustrates a system 700 for managing objects within an object store (a remote object store) using an object file system. The objects may store snapshot data of snapshots that can be restored on-demand to an on-demand volume using a restore process (e.g., an on-demand restore process) such that clients are provided with access to the snapshot data during and before completion of the restore process. A computing device 702 may comprise a node, a storage controller, a storage service, an on-premises computing device, a storage virtual machine, or any other hardware or software. The computing device 702 may store data 706 within storage devices (primary storage) managed by the computing device 702. The computing device 702 may provide client devices with access to the data 706, such as by processing read and write operations from the client devices. The computing device 702 may create snapshots 704 of the data 706, such as a snapshot of a file system of a volume accessible to the client devices through the computing device 702. The computing device 702 may be configured to communicate with an object store 709 over a network. The object store 709 may comprise a cloud computing environment remote to the computing device 702.

As provided herein, an object file system and object format is provided for storing and accessing data, such as snapshots, stored within objects in the object store 709. The data 706, maintained by the computing device, is stored into a plurality of slots of an object 708. Each slot represents a base unit of data of the object file system defined for the object store 709. For example, the object 708 comprises or any other number of slots (e.g., 1024 slots), wherein each slot comprises 7 kb of data or any other amount of data. It may be appreciated that objects may comprise any number of slots of any size. User data, directory blocks, metadata, and/or inofile blocks of an inofile comprising per inode metadata is stored into the slots of the object 708. In some embodiments, snapshot data, of a snapshot created by the computing device 702 of a file system maintained by the computing device 702, is stored into the object 708. For example, the object 708 may be maintained as an independent logical representation of the snapshot, such that data of the snapshot is accessible through the object 708 without having to reference other logical copies of other snapshots stored within objects 710 of the object store 709. In some embodiments, the data is converted from physical data into a version independent format for storage within the object 708.

In some embodiments, the object 708 is created to comprise data in a compressed state corresponding to compression of the data within the primary storage of the computing device 702. In this way, compression used by the computing device 702 to store the data is retained within the object 708 for storage within the object store 709. The object 708 may be assigned a unique sequence number. Each object within the object store 709 is assigned unique sequence numbers.

An object header may be created for the object 708. The object header comprises a slot context for slots within the object 708. The slot context may comprise information relating to a type of compression used for compressing data within the object 708 (if any compression is used), a start offset of a slot, a logical data length, a compressed data length, etc. The slot context may be used to access compressed data stored within the object 708.

FIG. 7C illustrates an example of the object 708. The object 708 comprises an object header 736 and a plurality of slots, such as a slot 726, a slot 728, a slot 730, and/or any other number of slots. The object header 736 may have a size that is aligned with a start of the plurality of slots, such as having a 7 kb alignment based upon each slot having a logical length of 7 kb. It may be appreciated that slots may have any length. The object header 736 comprises various information, such as a version identifier, a header checksum, a length of the object 708, a slot context 732, and/or other information used to access and manage data populated into the slots of the object 708.

The slot context 732 comprises various information about the slots, such as a compression type of a slot (e.g., a type of compression used to compress data of slots into a compression group or an indicator that the slot does not comprise compressed data), a start offset of the slot within the object 708 (e.g., a slot identifier multiplied by a slot size, such as 7 kb), a logical data length of the slot (e.g., 7 kb), a compressed length (e.g., 0 if uncompressed), an index of the slot within a compression group of multiple slots (e.g., 0 if uncompressed), a logical data checksum, etc.

The data stored within the slots of the object 708 are represented as a data structure (e.g., a structure that is traversable by a data connector component). The data structure may comprise a tree structure or any other type of structure. For example, the data structure comprises the tree structure representing a file. The data structure may be populated with a plurality of nodes at various levels of the tree structure. The nodes may be represented by cloud block numbers. A cloud block number of a node may comprise a sequence number used to uniquely identify the object 708 and/or a slot number of a slot comprising a portion of the data represented by the node. User data, directory blocks, metadata, inofile blocks of an inofile, and/or other data stored within the slots of the object 708 may be represented by nodes within the data structure. In some embodiments, user data is stored within leaf nodes of the data structure (e.g., nodes within a level 0 (L0) level of the tree structure). Pointers (indirects) may be stored within non-leaf nodes of the data structure (e.g., nodes within a level 1(L1), a level 2 (L2), and/or other levels of the tree structure). An inode object for the file may comprise pointers that point to non-leaf nodes within a top level of the data structure.

In some embodiments of the tree structure, a 1 TB file may be represented by the tree structure. An inode of the file may comprise metadata and/or a flat list of 4845 pointers or any other number of pointers to nodes within a level 2 of the tree structure (e.g., there are 4845 nodes (4 kb blocks) within the level 2 of the tree structure). The level 2 comprises the 4845 nodes (4 kb blocks), each having 255 pointers or any other number of pointers to nodes within a level 1 of the tree structure (e.g., there are 780393 (4 kb blocks) within the level 1 of the tree structure. The level 1 comprises the 780393 (4 kb blocks), each having 255 pointers to nodes within a level 0 of the tree structure. The level 0 comprises 250,000,000 nodes (4 kb blocks) representing actual data, such as user data.

FIG. 7B illustrates a snapshot file system of data structures 724 (e.g., a tree structure that can be traversed by a data connector component) used to represent snapshots (e.g., snapshots of one or more volumes managed by the computing device 702) stored into the objects 710 of the object store 709. There is one base root object per volume, such as a base root object 712 for a volume of which the snapshots were captured. There is a unique root object per volume, such as a unique root object 714 for the volume. The base root object 712 may point to the unique root object 714. Names of the unique root objects may be derived from increasing generation numbers. The unique root object 714 may point to snapinfo objects, such as a snapinfo object 716 comprising information regarding one or more snapshots, such as a pointer to an inofile 718 of a second snapshot of the volume. The inofile 718 comprises cloud block numbers of slots within an object comprising data of the second snapshot, such as a pointer to an indirect 720 that points to data 722 of the snapshot. The inofile 718 may comprise or point to information relating to directories, access control lists, and/or other information.

A mapping metafile (a VMAP) is maintained for the object 708. The mapping metafile maps block numbers of primary storage of the computing device 702 (e.g., virtual volume block numbers of the data stored into slots of the object 708) to cloud block numbers of nodes representing portions of the data stored within the slots of the object 708. The object 708 is stored within the object store 709. In some embodiments of storing objects into the object store 709, the plurality of snapshots 704, maintained by the computing device 702, are stored within objects 710 of the object store 709. Each snapshot is identifiable through a snapinfo object that has a unique generation number. As will be described later, the objects 710 within the object store 709 may be deduplicated with respect to one another (e.g., the object 708 is deduplicated with respect to the object 710 using the mapping metafile as part of being stored into the object store 709) and retain compression used by the computing device 702 for storing the snapshots 704 within the primary storage.

The mapping metafile and/or the data structure are used to provide access through the object file system to portions of data within the slots of the object 708 in the object store 709. In some embodiments, the inode object and the data structure are traversed to identify a sequence number and slot number of requested data. The sequence number and the slot number are used to access the requested data within a corresponding slot of the object 708. In some embodiments, a read request targets a 100,000th level 0 block stored within the object 708. The inode object is read to calculate which blocks in each level of the data structure will have 100,000 (e.g., 100,000/255 is a 493th block in level 1 and 493/255 is a 2nd block in level 2). These blocks are read at each level to go to a next level through appropriate pointers (e.g., cloud block numbers) until the data is read from a block of user data within the level 0. The pointers are cloud block numbers, where a pointer comprises a sequence number of the object 708 and a slot number. The sequence number corresponds to an object name of the object 708 and the slot number is which slot the data is located within the object 708.

In an embodiment, an on-demand restore of data within a snapshot stored within objects of the object store 709 can be performed to a target computing device using the mapping metafile and/or the data structure. In an embodiment, the mapping metafile and/or the data structure may be used to free objects from the object store 709 based upon the objects comprising snapshot data of snapshots deleted by the computing device 702.

In an embodiment, the mapping metafile and/or an overflow mapping metafile are used to facilitate the copying of the snapshots to the object store 709 in a manner that preserves deduplication and compression, logically represents the snapshots as fully independent snapshots, and provides additional compression. In particular, the mapping metafile is populated with entries for block numbers (e.g., virtual volume block numbers, physical volume block numbers, etc. used by the node to reference data such as snapshot data stored by the node) of the snapshots 704 maintained by the computing device 702 and copied into the objects 710 of the object store 709 as copied snapshots. An entry within the mapping metafile is populated with a mapping between a block number of data within a snapshot at the computing device 702 (e.g., a virtual volume block number) and a cloud block number (e.g., a cloud physical volume block number) of a slot within an object into which the data was copied when the snapshot was copied to the object store 709 as a copied snapshot. The entry is populated with a compression indicator to indicate whether data of the block number is compressed or not (e.g., a bit set to a first value to indicate a compressed virtual volume block number and set to a second value to indicate a non-compressed virtual volume block number).

The entry is populated with a compression group start indicator to indicate whether the block number is a starting block number for a compression group of a plurality of block numbers of compressed data blocks. The entry is populated with an overflow indicator to indicate whether the data block has an overflow entry within the overflow mapping metafile. The overflow mapping metafile may comprise a V+ tree, such as a special B+ tree with support for variable length key and payload so a key can be sized according to a type of entry being stored for optimization. The key uniquely represents all types of entries associated with a block number (a virtual volume block number). The key may comprise a block number field (e.g., the virtual volume block number of a data block represented by the block number or a starting virtual volume block number of a first data block of a compression group comprising the data block), a physical length of an extent of the data block, if the corresponding entry is a start of a compression group, and other block numbers of blocks within the compression group. The payload is a cloud block number (a cloud physical volume block number). The entry may be populated with a logical length of an extent associated with the block number. The entry may be populated with a physical length of the extent associated with the block number.

The mapping metafile and/or the overflow mapping metafile may be indexed by block numbers of the primary storage (e.g., virtual volume block numbers of snapshots stored by the computing device 702 within the primary storage, which are copied to the object store as copied snapshots). In some embodiments, the block numbers may correspond to virtual volume block numbers of data of the snapshots stored by the computing device 702 within the primary storage. In some embodiments, a block number corresponds to a starting virtual volume block number of an extent of a compression group.

The mapping metafile and/or the overflow mapping metafile is maintained according to a first rule specifying that the mapping metafile and/or the overflow mapping metafile represent a comprehensive set of cloud block numbers corresponding to a latest snapshot copied to the object. The mapping metafile and/or the overflow mapping metafile is maintained according to a second rule specifying that entries within the mapping metafile and/or the overflow mapping metafile are invalidated based upon any block number in the entries being freed by the computing device 702.

The mapping metafile and/or the overflow mapping metafile is used to determine what data of the current snapshot is to be copied to the object store 709 and what data already exists within the object store 709 so that only data not already within the object store 709 is transmitted to the object store 709 for storage within an object. Upon determining that the current snapshot is to be copied to the object store 709, an invalidation phase is performed. In particular, a list of deallocated block numbers of primary storage of the computing device 702 (e.g., virtual volume block numbers, of the file system of which snapshots are created, that are no longer being actively used to store in-use data by the node) are determined based upon a difference between a first snapshot and a second snapshot of the primary storage (e.g., a difference between a base snapshot and an incremental snapshot of the file system). As part of the invalidation phase, entries for the list of deallocated block numbers are removed from the mapping metafile and/or the overflow mapping metafile.

After the invalidation phase, a list of changed block numbers corresponding to changes between the current snapshot of the primary storage being copied to the object store 709 and a prior copied snapshot already copied from the primary storage to the object store 709 is determined. The mapping metafile is evaluated using the list of changed block numbers to identify a deduplicated set of changed block numbers without entries within the mapping metafile. The deduplicated set of changed block numbers correspond to data, of the current snapshot, not yet stored within the object store 709.

An object is created to store data of the deduplicated set of changed block numbers. The object comprises a plurality of slots, such as 1024 or any other number of slots. The data of the deduplicated set of changed block numbers is stored into the slots of the object. An object header is updated with metadata describing the slots. In some embodiments, the object is created to comprise the data in a compressed state corresponding to compression of the data in the primary storage. The object can be compressed by combining data within contiguous slots of the object into a single compression group. In this way, compression of the current snapshot maintained by the node is preserved when the current snapshot is stored in the object store as the object corresponding to a copy of the current snapshot.

The object, comprising the data of the deduplicated set of changed block numbers, is transmitted to the object store 709 for storage as a new copied snapshot that is a copy of the current snapshot maintained by the node. The object is stored as a logical copy of the current snapshot. Also, additional compression is applied to this logical data, and information used to uncompress the logical data is stored in the object header. Further, the object is maintained as an independent logical representation of the current snapshot, such that copied data, copied from the current snapshot, is accessible through the object without having to reference other logical copies of other copied snapshots stored in other objects within the object store 709. Once the object is stored within the object store 709, the mapping metafile and/or the overflow mapping metafile is updated with entries for the deduplicated set of changed block numbers based upon receiving an acknowledgment of the object being stored by the object store 709. An entry will map a changed block number to a cloud block number of a slot within which data of the changed block number is stored in the object.

In an embodiment, the object file system is used to provide various primary storage system services for the object store 709 in order to achieve efficient space and resource management, and flexible scaling in the object store 709 (e.g., a cloud computing environment). Additionally, pseudo read only snapshots are provided through the object store 709. Consumers of these snapshots may choose to derive just the logical data represented by these snapshots or can additionally derive additional metadata associated with the logical data if required. This additional metadata is created post snapshot creation and hence is not directly part of logical view of the snapshot. The present system provides flexible, scalable, and cost effective techniques for leveraging cloud storage for off-premises operations on secondary data, such as analytics, development testing, virus scan, load distribution, etc. Objects may be modified (e.g., a unit of storage within a cloud storage environment) without changing the meaning or accessibility of useable data in the objects (e.g., a cloud object comprising a snapshot copy of primary data maintained by the computing device 702). Objects may be modified to add additional metadata and information such as analytics data, virus scan data, etc. to useable data without modifying the useable data. Thus, an object is maintained as a pseudo read only object because in-use data is unmodifiable while unused or freed data is modifiable such as by a defragmentation and/or garbage collection process.

Changes in objects can be detected in order to resolve what data of the objects is the correct data. The present system provides the ability to perform defragmentation and garbage collection for objects by a cloud service hosted by the object store 709, such as a cloud storage environment. Defragmentation and garbage collection are provided without affecting access to other in-use data within objects (e.g., in-use snapshot data stored within an object that is used by one or more applications at various remote computers). This allows for more true distributed and infinite scale data management. The present system provides for the ability to run analytics on objects (e.g., read/write analytics of data access to data within an object) using analytic applications hosted within the cloud storage environment. The analytics can be attached to objects even though the objects are read only. The present system provides for deduplication of objects. In this way, objects can be modified while still maintaining consistency of in-use data within the objects (e.g., maintaining consistency of a file system captured by a snapshot that is stored within an object) and without compromising a read only attribute of the objects. Also, computationally expensive processes like garbage collection, analytics, and defragmentation are offloaded from on-premises primary storage systems, such as the computing device 702, to the object store 709 such as cloud services within the cloud storage environment.

In one embodiment, objects within the object store 709 (e.g., objects within a cloud computing environment) can be maintained with a read only attribute such that data within objects can be overwritten/modified/freed so long as in-use data within the objects is not altered. In particular, an object may be maintained within the object store 709, such as a cloud computing environment. The object comprises a plurality of slots, such as 1024 or any other number of slots. Each slot is used to store a unit of data. The data within each slot is read-only. In particular, the data is read only when in-use, such as where one or more applications are referencing or using the data (e.g., an application hosted by the computing device 702 is storing data of a snapshot of a local file system within a slot of an object, and thus the snapshot data is in-use until a particular event occurs such as the computing device 702 deleting the snapshot). In some embodiments, the object comprises snapshot data of a file system, a volume, a logical unit number (LUN), a file, or any other data of the computing device 702. In this way, the object comprises a read only snapshot of data of the computing device 702. In one example, a plurality of objects corresponding to read only snapshots of the file system of the computing device 702 are stored within the object store 709. Each object is assigned a unique sequence identifier.

A first rule is enforced for the object. The first rule specifies that in-use slots are non-modifiable and unused slots are modifiable. An in-use slot is a slot that stores data actively referenced, used, and/or maintained by a computing device 702 (a primary storage system). For example, an in-use slot may be a slot that comprises snapshot data (e.g., secondary/replicated data) of a snapshot created by a computing device 702. The slot becomes an unused slot when the data is no longer actively referenced, used, and/or maintained, such as where the computing device 702 deletes the snapshot. Thus, if a slot is in-use, then the data within the slot cannot be modified. Otherwise, data in unused slots (e.g., stale data that is no longer referenced or used) can be modified, such as deleted/freed by garbage collection functionality or defragmentation functionality.

Additional information for the object may be generated. The additional information may comprise analytics (e.g., read/write statistics of access to the object), virus scan information, development testing data, and/or a variety of other information that can be generated for the object and the data stored therein. In some embodiments, the additional data is generated by a cloud service or application executing within the cloud computing environment. This will offload processing and resource utilization that would otherwise be used by the computing device 702 (primary storage system) to perform such analytics and processing.

Metadata of the additional information is attached to an object header of the object. The object header is used to store metadata for each slot of the object. In one example, the metadata specifies a location of the additional information within the object, such as a particular slot into which the additional information is stored. In another example, the metadata may comprise the additional information, and thus the additional information is stored into the object header. The metadata is attached in a manner that does not change a meaning or accessibility of useable data within in-use slots of the object. In particular, applications that are allowed to merely access user data within the object (e.g., the applications are unaware or have no reason to access the additional information) are provided with only access to the user data and are not provided with access to the metadata or additional information. Thus, these applications continue to access user data within the object in a normal manner. For application that are allowed to access both the user data and the additional information, those applications are provided with access to the user data and the metadata for identifying and accessing a location of the additional information within the object. The first rule is enforced such that user data (in-use data) is retained in an unmodified state within the object notwithstanding the metadata and/or additional information being associated with the object.

In some embodiments, a second rule is enforced for the object. The second rule specifies that related read operations are to be directed to a same version of an object. For example, an object corresponds to secondary/replicated snapshot data of a file system maintained by the computing device 702. Each time a new snapshot of the file system is created, a new version of the object is created to capture changes to the file system. In another example, since in-use data within the object is read only and unmodifiable, any modifications to slots with in-use data will result in a new version of the object being created with the modified data.

If multiple read operations are related, then those read operations should be executed upon the same version of the object for data consistency purposes. This is achieved by comparing timestamp data of the related read operations. If the timestamp data between the related read operations is mismatched, then the related read operations are retried because the related read operations were executed upon different versions of the same object. If the timestamp data between the read operations matches, then the related read operations are considered successful. In some embodiments, a first related read operation reads the object header of the object to identify a slot from which data is to be read. A second related read operation is executed to read data from the slot. The two related read operations should be executed upon the same version of the object/slot (e.g., the operations can be executed upon different versions such as where data of a current version of the object is modified between execution of the operations, thus creating a new version of the object with the modified data since the object is read only and the original data is unmodifiable within the current version of the object). Thus, timestamp data of the two related read operations is used to determine whether the two related read operations were executed upon the same version of the object/slot and thus should be considered complete or should be retried.

In one embodiment, garbage collection is provided for objects within the object store 709. The objects have a read only state, such that enforcement of the first rule ensures that in-use data within slots of an object is not modifiable, thus making objects pseudo read only objects because only unused slots can be modified/freed of unused data. In some embodiments, an object is used to store data of a snapshot of a file system hosted by the computing device 702. The snapshot may be determined as being deleted by the computing device 702, and thus slots comprising snapshot data of the deleted snapshot are now considered to be unused slots as opposed to in-use slots.

Each snapshot of the file system may be associated with a bitmap that identifies objects within the object store that correspond to a particular snapshot. Thus, the bitmaps can be evaluated to identify what objects comprise data of particular snapshots. For example, a bitmap of the deleted snapshot can be used to identify the object and other objects as comprising data of the deleted snapshot.

A garbage collection operation is executed to free objects (e.g. free unused data from unused slots) from the object store in order to reduce storage utilization of the object store that would otherwise be unnecessarily used to store stale/unused data. In some embodiments, the garbage collection operation is executed by a cloud service in order to conserve resource consumption by the computing device 702 (primary storage system) otherwise used to execute the garbage collection operation. The garbage collection operation free objects from the object store 709 based upon the objects uniquely corresponding to deleted snapshots. That is, if an object stores data of only deleted snapshots and does not store data of active/undeleted snapshots, then the garbage collection process can free/delete that object. For example, the bitmaps describing objects within the object store 709 that are related to snapshots of the file system are evaluated to determine whether the object is unique to the deleted snapshot and/or unique to only deleted snapshots (e.g., the object does not comprise data of active/undeleted snapshots). If so, then the object is freed from the object store 709. However, if the object is not unique to only deleted snapshot(s) such as where the object also stores data of an active/undeleted snapshot, then the object is not freed.

In an embodiment, defragmentation is provided for fragmented objects within the object store 709. In some embodiments, defragmentation is implemented by a cloud service or application executing in the object store 709 in order to conserve resources otherwise used by a computing device 702 (primary storage system) that would execute defragmentation functionality. An object within the object store 709 is determined to be a fragmented object based upon the object comprising at least one freed slot from which data was freed. For example, a freed slot may comprise an unused slot comprising unused data no longer referenced/used by the computing device 702 (e.g., data of a deleted snapshot). Accordingly, the fragmented object may comprise one or more in-use slots of in-use data currently referenced/used by a computing device 702 and one or more freed slots of freed data (e.g., unused slots comprising unused data).

The fragmented object is compacted to retain the in-use data and exclude the freed data (the unused data) as a written object. Because compacting may store the in-use data in new slots, an object header of the object is updated with new locations of the in-use data within the rewritten object. In this way, defragmentation is performed for objects within the object store 709.

The present system preserves deduplication and compression used by the computing device 702 for snapshots when storing copied snapshots to the object store 709 notwithstanding copied snapshots representing fully logical copies of data in the primary storage of the computing device 702. In particular, deduplication is preserved because data that is shared in a snapshot (e.g., a local or primary snapshot created and maintain by the node) is also shared in a copied snapshot in the object store 709. Deduplication of compression groups is maintained while logically representing the compression groups in a copied snapshot. Block sharing across multiple snapshots is also preserved so that merely changed blocks are transferred/copied to the object store 709 during incremental snapshot transfers.

Additional compression may be provided for a snapshot data copy. In particular, larger compression groups provide more space efficiency but with less read efficiency compared to smaller compression groups. Relatively smaller compression groups may be used by the computing device 702 of the storage system since access to the primary storage of the computing device 702 may be more read intensive, and thus read efficiency is prioritized over storage space efficiency. Because copied snapshots in the object store 709 are infrequently accessed (e.g., cold data that is infrequently read), relatively larger compression groups can be employed for improved storage space efficiency within the object store, which also reduces network bandwidth for snapshot copying to the object store 709.

In one embodiment, snapshots maintained by the computing device 702 are copied to the object store 709 as copied snapshots representing logical data of the snapshots. Data of the copied snapshots is stored into slots of objects that are deduplicated with respect to other objects stored within the object store 709 and retain compression used by the computing device 702 for the snapshots.

In some embodiments, the computing device 702 stores data within primary storage. The computing device 702 may create snapshots of the data stored by the computing device 702. For example, the computing device 702 may create a snapshot of a file, a logical unit number, a directory, a volume, a storage virtual machine hosting a plurality of volumes, a file system, a consistency group of any arbitrary grouping of files, directories, or data, etc. The computing device 702 may deduplicate data between the snapshots so that instead of storing redundant data blocks multiple times, merely references are stored in place of the redundant data blocks and point to original data blocks with the same data. The computing device 702 may compress data within the snapshots, such as by creating compression groups of compressed data blocks.

The mapping metafile and/or the overflow mapping metafile is used to determine what data of the current snapshot is to be copied to the object store 709 and what data already exists within the object store so that only data not already within the object store is transmitted to the object store 709 for storage within an object. Upon determining that the current snapshot is to be copied to the object store, an invalidation phase is performed. In particular, a list of deallocated block numbers of primary storage of the computing device 702 (e.g., virtual volume block numbers, of the file system of which snapshots are created, that are no longer being actively used to store in-use data by the node) are determined based upon a difference between a first snapshot and a second snapshot of the primary storage (e.g., a difference between a base snapshot and an incremental snapshot of the file system). As part of the invalidation phase, entries for the list of deallocated block numbers are removed from the mapping metafile and/or the overflow mapping metafile.

In some embodiments, a system is provided. The system comprises: an orchestrator building a catalog of snapshots stored within an object store, wherein snapshot data of the snapshots is stored within objects according to an object format and snapshot file system; and an object store data management container within which a snapshot difference interface configured to interpret the object format is integrated, wherein the snapshot difference interface: receives a request from the orchestrator for snapshot differences amongst a first snapshot and a second snapshot in the object store; traverses a first snapshot file system of the first snapshot and a second snapshot file system of the second snapshot while the first snapshot and the second snapshot are stored within the object store to determine the snapshot differences; and transmits the snapshot differences to the orchestrator for building the catalog.

In some embodiments, the snapshot difference interface generates checkpoints while identifying a set of snapshot differences amongst a set of snapshots, and wherein a checkpoint is utilized by the snapshot difference interface to resume processing of the set of snapshots from a progress point of the processing captured by the checkpoint.

In some embodiments, the snapshot different interface is configured to transmit batches of snapshot differences to the orchestrator.

In some embodiments, the snapshot difference interface processes a subsequent request for identifying snapshot differences between a first pair of snapshots from a point where a prior request for identify snapshot differences between a second pair of snapshots left off.

In some embodiments, the orchestrator displays the catalog through a user interface for browsing snapshots, versions of files captured by the snapshots, versions of metadata captured by the snapshots, and versions of directories captured by the snapshots.

In some embodiments, the orchestrator displays the catalog through a user interface for browsing snapshots, and wherein the orchestrator visually modifies the display of the catalog in response to user input navigating amongst content of the snapshots represented within the catalog.

In some embodiments, the orchestrator displays the catalog through a user interface for browsing snapshots, and wherein the orchestrator facilitates a restore operation of a version of a file captured by one or more snapshots within the object store based upon user input through the catalog used to select the version of the file to restore.

In some embodiments, the snapshot difference interface performs a difference operation upon an inofile root to obtain file block numbers representing blocks of changed inodes between the first snapshot and the second snapshot.

In some embodiments, the snapshot difference interface reads the blocks represented by the file block numbers and performs difference operations on the blocks to identify inodes that are different.

In some embodiments, the snapshot difference interface reads a set of the inodes from the first snapshot and the second snapshot to identify inodes that are different, and wherein for an inode with a link, traversing an inode to path to obtain changed link inodes.

In some embodiments, the snapshot difference interface constructs a file name by: perform a reverse lookup for an inode identified as different between the first snapshot and the second snapshot to obtain parent inode and an entry offset within the parent inode; and perform a traversal of parent inodes using entry offsets to reach a root inode specifying the file name.

In some embodiments, a method is provided. The method comprises initiating, by an orchestrator, a catalog build process to build a catalog of snapshots stored within an object store, wherein snapshot data of the snapshots is stored within objects according to an object format and snapshot file system; receiving, by a snapshot difference interface integrated into an object store data management container and configured to interpret the object format, a request from the orchestrator for snapshot differences amongst a first snapshot and a second snapshot in the object store; traversing a first snapshot file system of the first snapshot and a second snapshot file system of the second snapshot while the first snapshot and the second snapshot are stored within the object store to determine the snapshot differences; and transmitting the snapshot differences to the orchestrator for building the catalog.

In some embodiments, the method includes generating checkpoints while identify a set of snapshot differences amongst a set of snapshots; and utilizing a checkpoint by the snapshot difference interface to resume processing of the set of snapshots from a progress point of the processing captured by the checkpoint.

In some embodiments, the method includes transmitting batches of snapshot differences to the orchestrator.

In some embodiments, the method includes processing a subsequent request for identifying snapshot differences between a first pair of snapshots from a point where a prior request for identify snapshot differences between a second pair of snapshots left off.

In some embodiments, the method includes displaying the catalog through a user interface for browsing snapshots, versions of files captured by the snapshots, versions of metadata captured by the snapshots, and versions of directories captured by the snapshots.

In some embodiments, the method includes displaying the catalog through a user interface for browsing snapshots; visually modifying the display of the catalog in response to user input navigating amongst content of the snapshots represented within the catalog.

In some embodiments, the method includes displaying the catalog through a user interface for browsing snapshots; and facilitating a restore operation of a version of a file captured by one or more snapshots within the object store based upon user input through the catalog used to select the version of the file to restore.

In some embodiments, a non-transitory machine readable medium is provided. The non-transitory machine readable medium comprises instructions, which when executed by a machine, causes the machine to: initiate, by an orchestrator, a catalog build process to build a catalog of snapshots stored within an object store, wherein snapshot data of the snapshots is stored within objects according to an object format and snapshot file system; receive, by a snapshot difference interface integrated into an object store data management container and configured to interpret the object format, a request from the orchestrator for snapshot differences amongst a first snapshot and a second snapshot in the object store; traverse a first snapshot file system of the first snapshot and a second snapshot file system of the second snapshot while the first snapshot and the second snapshot are stored within the object store to determine the snapshot differences; and transmit the snapshot differences to the orchestrator for building the catalog.

In some embodiments, the instructions include generate checkpoints while identifying a set of snapshot differences amongst a set of snapshots; and utilize a checkpoint by the snapshot difference interface to resume processing of the set of snapshots from a progress point of the processing captured by the checkpoint.

Figure 8:
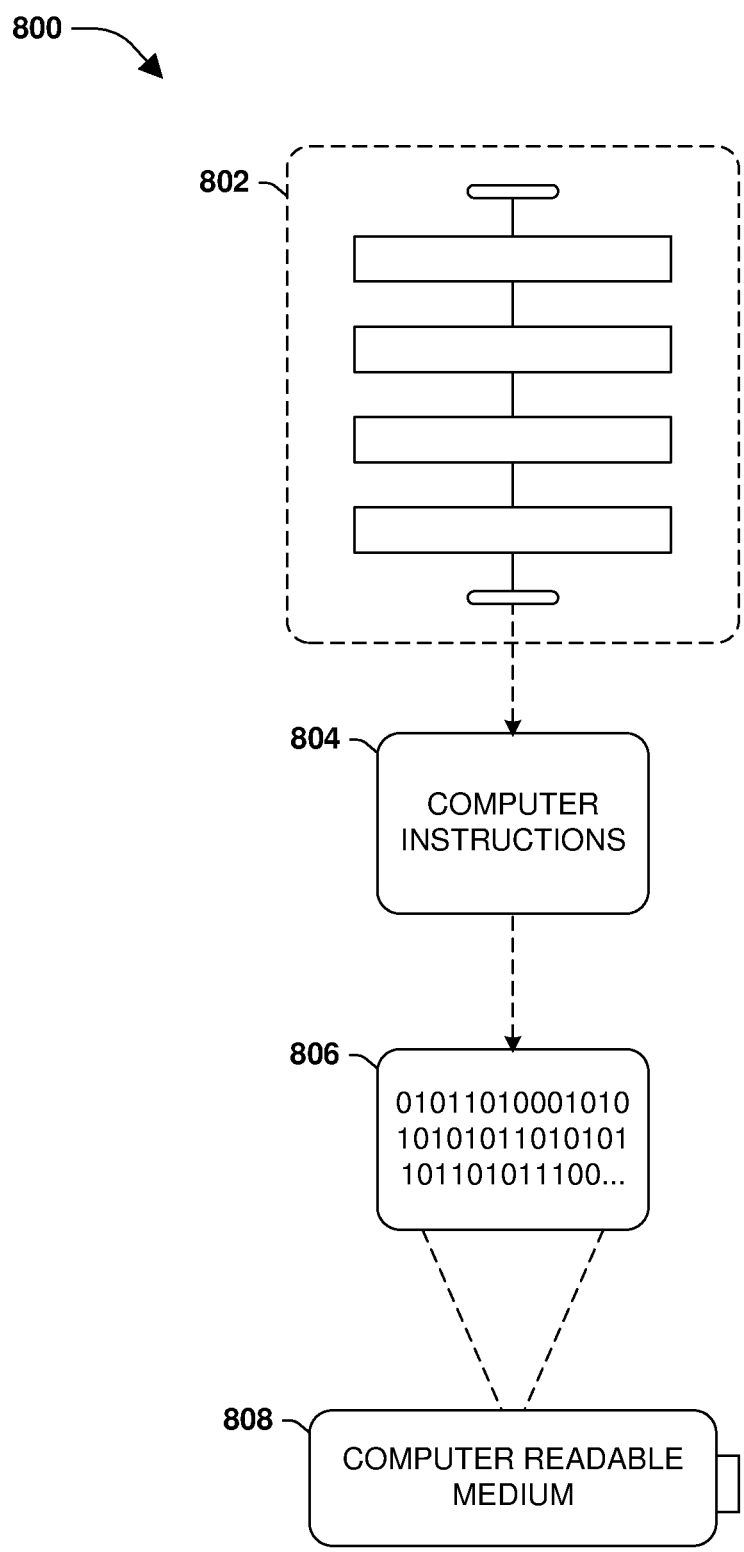
FIG. 8 is an example of a computer readable medium in which an embodiment of the present technology may be implemented.

Still another embodiment involves a computer-readable medium 800 comprising processor-executable instructions configured to implement one or more of the techniques presented herein. An example embodiment of a computer-readable medium or a computer-readable device that is devised in these ways is illustrated in FIG. 8, wherein the implementation comprises a computer-readable medium 808, such as a compact disc-recordable (CD-R), a digital versatile disc-recordable (DVD-R), flash drive, a platter of a hard disk drive, etc., on which is encoded computer-readable data 806. This computer-readable data 806, such as binary data comprising at least one of a zero or a one, in turn comprises processor-executable computer instructions 804 configured to operate according to one or more of the principles set forth herein. In some embodiments, the processor-executable computer instructions 804 are configured to perform a method 802, such as at least some of the exemplary method 100 of FIG. 1 and/or at least some of the method 400 of FIG. 4, for example. In some embodiments, the processor-executable computer instructions 804 are configured to implement a system, such as at least some of the exemplary system 200 of FIG. 2, at least some of the exemplary system 300 of FIG. 3, and/or at least some of the exemplary system 500 of FIGS. 5A and 5B, for example. Many such computer-readable media are contemplated to operate in accordance with the techniques presented herein.

In an embodiment, the described methods and/or their equivalents may be implemented with computer executable instructions. Thus, in an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on. In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
    receiving a snapshot difference request from an application, wherein the snapshot difference request specifies a first snapshot identifier of a first snapshot and a second snapshot identifier of a second snapshot, wherein snapshot data of the first snapshot and the second snapshot is stored within objects of an object store of a cloud computing environment according to an object format;
    identifying a first snapshot file system of the first snapshot and a second snapshot file system of the second snapshot based upon the first snapshot identifier and the second snapshot identifier;
    traversing the first snapshot file system of the first snapshot and the second snapshot file system of the second snapshot to identify differences between the first snapshot and the second snapshot;
    generating checkpoints while identifying the snapshot differences amongst the first snapshot and the second snapshot;
    utilizing a checkpoint to resume processing of the first snapshot file system and the second snapshot file system from a progress point of the processing captured by the checkpoint; and
    transmitting the differences to the application in response to the snapshot difference request.

2. The method of claim 1, wherein the differences are provided to the application as part of a first compliance scan associated with a volume, and wherein the first compliance scan is performed upon the first snapshot and the second snapshot based upon the first snapshot and the second snapshot being snapshots of the volume.

3. The method of claim 2, comprising:
    performing a second compliance scan at a second point in time subsequent a first point in time of when the first compliance scan was performed, wherein performing the second compliance scan includes:
        in response to determining that the first compliance scan was performed upon the first snapshot and the second snapshot, identifying a third snapshot of the volume, wherein the third snapshot was created subsequent the first snapshot and the second snapshot and is stored within the object store of the cloud computing environment;
        traversing a third snapshot file system of the third snapshot to identify differences between the second snapshot and the third snapshot; and
        performing the second compliance scan upon the differences between the second snapshot and the third snapshot, wherein the second compliance scan skips common snapshot data amongst the second snapshot and the third snapshot.

4. The method of claim 3, wherein the second compliance scan skips snapshot data scanned by the first compliance scan.

5. The method of claim 1, comprising:
transmitting a batch of snapshot differences to the application as a response to the snapshot difference request.

6. The method of claim 1, comprising:
accumulating the differences as batches of snapshot differences among the first snapshot and the second snapshot; and
transmitting the batches of snapshot differences to the application as a response to the snapshot difference request.

7. The method of claim 1, comprising:
determining that a prior snapshot difference request for identifying the differences between the first snapshot and the second snapshot left off at the progress point; and
utilizing the progress point to resume processing of the first snapshot file system and the second snapshot file system.

8. The method of claim 1, comprising:
executing a difference operation upon an inofile root associated with at least one of the first snapshot file system or the second snapshot file system to obtain file block numbers representing blocks of changed inodes between the first snapshot and the second snapshot stored within the object store of the cloud computing environment; and
identifying the differences based upon the blocks of changed inodes represented by the file block numbers.

9. The method of claim 1, comprising:
executing a difference operation upon an inofile root associated with at least one of the first snapshot file system or the second snapshot file system to obtain file block numbers different between the first snapshot and the second snapshot stored within the object store of the cloud computing environment;
performing difference operations upon the blocks represented by the file block numbers to identify inodes that are different between the first snapshot and the second snapshot; and
identifying the differences based upon files represented by the inodes that are different between the first snapshot and the second snapshot.

10. The method of claim 1, comprising:
reading a set of inodes from the first snapshot and the second snapshot to identify inodes that are different between the first snapshot and the second snapshot stored within the object store of the cloud computing environment, wherein the reading comprises:
identifying an inode that includes a link;
traversing an inode to path associated with the link to identify changed link inodes that are different between the first snapshot and the second snapshot; and
identifying the changed link inodes as part of the inodes that are different between the first snapshot and the second snapshot; and
identifying the differences based upon files represented by the inodes that are different between the first snapshot and the second snapshot.

11. The method of claim 1, comprising:
identifying an inode as different between the first snapshot and the second snapshot;
performing a reverse lookup for the inode to identify a parent inode and an entry offset within the parent inode; and
traversing from the inode to the parent inode and up through at least one of the first snapshot file system or the second snapshot file system using the entry offset within the parent inode and entry offsets of other inodes encountered during the traversal to reach a root inode specifying a file name of a file represented by the inode, wherein the file is identified as being different between the first snapshot and the second snapshot; and
identifying the differences as the file having the file name.

12. A non-transitory machine readable medium comprising instructions for performing a method, which when executed by a machine, causes the machine to perform operations comprising:
receiving a snapshot difference request from an application, wherein the snapshot difference request specifies a first snapshot identifier of a first snapshot and a second snapshot identifier of a second snapshot, wherein snapshot data of the first snapshot and the second snapshot is stored within objects of an object store of a cloud computing environment according to an object format;
identifying a first snapshot file system of the first snapshot and a second snapshot file system of the second snapshot based upon the first snapshot identifier and the second snapshot identifier;
traversing the first snapshot file system of the first snapshot and the second snapshot file system of the second snapshot to identify differences between the first snapshot and the second snapshot;
accumulating the differences as batches of snapshot differences among the first snapshot and the second snapshot; and
transmitting the batches of snapshot differences to the application in response to the snapshot difference request.

13. The non-transitory machine readable medium of claim 12, wherein the differences are provided to the application as part of a first compliance scan associated with a volume, and wherein the first compliance scan is performed upon the first snapshot and the second snapshot based upon the first snapshot and the second snapshot being snapshots of the volume.

14. The non-transitory machine readable medium of claim 13, wherein the operations comprise:
performing a second compliance scan at a second point in time subsequent a first point in time of when the first compliance scan was performed, wherein performing the second compliance scan includes:
in response to determining that the first compliance scan was performed upon the first snapshot and the second snapshot, identifying a third snapshot of the volume, wherein the third snapshot was created subsequent the first snapshot and the second snapshot and is stored within the object store of the cloud computing environment;
traversing a third snapshot file system of the third snapshot to identify differences between the second snapshot and the third snapshot; and
performing the second compliance scan upon the differences between the second snapshot and the third snapshot, wherein the second compliance scan skips common snapshot data amongst the second snapshot and the third snapshot.

15. The non-transitory machine readable medium of claim 14, wherein the second compliance scan skips snapshot data scanned by the first compliance scan.

16. The non-transitory machine readable medium of claim 14, wherein the first compliance scan and the second compliance scans are implemented by the application as part of enforcing a data retention policy associated with retaining snapshots of the volumes as backups within the cloud computing environment for a retention period.

17. The non-transitory machine readable medium of claim 14, wherein the first compliance scan and the second compliance scans are implemented by the application as part of enforcing write-once read-many (WORM) compliance for snapshots, of the volume, backed up to the cloud computing environment.

18. The non-transitory machine readable medium of claim 14, wherein the first compliance scan and the second compliance scans are implemented by the application as part of complying with a data privacy regulation.

19. A computing device comprising:
a memory storing instructions; and
a processor coupled to the memory, the processor configured to execute the instructions to perform operations comprising:
receiving a snapshot difference request from an application, wherein the snapshot difference request specifies a first snapshot identifier of a first snapshot and a second snapshot identifier of a second snapshot, wherein snapshot data of the first snapshot and the second snapshot is stored within objects of an object store of a cloud computing environment according to an object format;
identifying a first snapshot file system of the first snapshot and a second snapshot file system of the second snapshot based upon the first snapshot identifier and the second snapshot identifier;
traversing the first snapshot file system of the first snapshot and the second snapshot file system of the second snapshot to identify differences between the first snapshot and the second snapshot;
determining that a prior snapshot difference request for identifying the differences between the first snapshot and the second snapshot left off at a progress point;
utilizing the progress point to resume processing of the first snapshot file system and the second snapshot file system; and
transmitting the differences to the application in response to the snapshot difference request.

20. The computing device of claim 19, wherein the differences are provided to the application as part of a first compliance scan associated with a volume, and wherein the first compliance scan is performed upon the first snapshot and the second snapshot based upon the first snapshot and the second snapshot being snapshots of the volume.

21. A method, comprising:
receiving a snapshot difference request from an application, wherein the snapshot difference request specifies a first snapshot identifier of a first snapshot and a second snapshot identifier of a second snapshot, wherein snapshot data of the first snapshot and the second snapshot is stored within objects of an object store of a cloud computing environment according to an object format;
identifying a first snapshot file system of the first snapshot and a second snapshot file system of the second snapshot based upon the first snapshot identifier and the second snapshot identifier;
traversing the first snapshot file system of the first snapshot and the second snapshot file system of the second snapshot to identify differences between the first snapshot and the second snapshot, wherein the traversing comprises:
executing a difference operation upon an inofile root associated with at least one of the first snapshot file system or the second snapshot file system to obtain file block numbers representing blocks of changed inodes between the first snapshot and the second snapshot stored within the object store of the cloud computing environment; and
identifying the differences based upon the blocks of changed inodes represented by the file block numbers; and
transmitting the differences to the application in response to the snapshot difference request.

22. A method, comprising:
receiving a snapshot difference request from an application, wherein the snapshot difference request specifies a first snapshot identifier of a first snapshot and a second snapshot identifier of a second snapshot, wherein snapshot data of the first snapshot and the second snapshot is stored within objects of an object store of a cloud computing environment according to an object format;
identifying a first snapshot file system of the first snapshot and a second snapshot file system of the second snapshot based upon the first snapshot identifier and the second snapshot identifier;
traversing the first snapshot file system of the first snapshot and the second snapshot file system of the second snapshot to identify differences between the first snapshot and the second snapshot, wherein the traversing comprises:
reading a set of inodes from the first snapshot and the second snapshot to identify inodes that are different between the first snapshot and the second snapshot stored within the object store of the cloud computing environment, wherein the reading comprises:
identifying an inode that includes a link;
traversing an inode to path associated with the link to identify changed link inodes that are different between the first snapshot and the second snapshot; and
identifying the changed link inodes as part of the inodes that are different between the first snapshot and the second snapshot; and
identifying the differences based upon files represented by the inodes that are different between the first snapshot and the second snapshot; and
transmitting the differences to the application in response to the snapshot difference request.

23. A method, comprising:
receiving a snapshot difference request from an application, wherein the snapshot difference request specifies a first snapshot identifier of a first snapshot and a second snapshot identifier of a second snapshot, wherein snapshot data of the first snapshot and the second snapshot is stored within objects of an object store of a cloud computing environment according to an object format;

identifying a first snapshot file system of the first snapshot and a second snapshot file system of the second snapshot based upon the first snapshot identifier and the second snapshot identifier;

traversing the first snapshot file system of the first snapshot and the second snapshot file system of the second snapshot to identify differences between the first snapshot and the second snapshot, wherein the traversing comprises:

identifying an inode as different between the first snapshot and the second snapshot;

performing a reverse lookup for the inode to identify a parent inode and an entry offset within the parent inode;

traversing from the inode to the parent inode and up through at least one of the first snapshot file system or the second snapshot file system using the entry offset within the parent inode and entry offsets of other inodes encountered during the traversal to reach a root inode specifying a file name of a file represented by the inode, wherein the file is identified as being different between the first snapshot and the second snapshot; and identifying the differences as the file having the file name; and transmitting the differences to the application in response to the snapshot difference request.

* * * * *